US011050787B1

(12) United States Patent
Sharifi Mehr

(10) Patent No.: US 11,050,787 B1
(45) Date of Patent: Jun. 29, 2021

(54) ADAPTIVE CONFIGURATION AND DEPLOYMENT OF HONEYPOTS IN VIRTUAL NETWORKS

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 284 days.

(21) Appl. No.: 15/694,425

(22) Filed: Sep. 1, 2017

(51) Int. Cl.
*G06F 21/00* (2013.01)
*G06F 21/53* (2013.01)
*G06F 21/55* (2013.01)
*H04L 29/06* (2006.01)
*G06F 9/455* (2018.01)

(52) U.S. Cl.
CPC ...... *H04L 63/1491* (2013.01); *G06F 9/45558* (2013.01); *H04L 63/1433* (2013.01); *G06F 2009/45587* (2013.01); *G06F 2009/45595* (2013.01)

(58) Field of Classification Search
CPC ............. H04L 63/1491; H04L 63/1433; G06F 9/45558; G06F 2009/45587; G06F 2009/45595
See application file for complete search history.

(56) References Cited

U.S. PATENT DOCUMENTS

| 9,602,536 B1 * | 3/2017 | Brown, Jr. .......... H04L 63/1491 |
| 2015/0326588 A1 * | 11/2015 | Vissamsetty ........ H04L 63/1491 726/23 |
| 2017/0180421 A1 * | 6/2017 | Shieh ...................... H04L 63/10 |
| 2017/0324776 A1 * | 11/2017 | Seger .................. H04L 63/1491 |

FOREIGN PATENT DOCUMENTS

EP 3057283 A1 * 8/2016 ............. G06F 21/55

OTHER PUBLICATIONS

Stewart Sentanoe; Benjamin Taubmann; Hans P. Reiser; "Virtual Machine Introspection Based SSH Honeypot"; SHCIS '17: Proceedings of the 4th Workshop on Security in Highly Connected IT Systems; ACM; Jun. 2017; pp. 13-18 (Year: 2017).*

* cited by examiner

*Primary Examiner* — Kendall Dolly
*Assistant Examiner* — Courtney D Fields
(74) *Attorney, Agent, or Firm* — Nicholson De Vos Webster & Elliott LLP

(57) ABSTRACT

Systems and methods are provided for adaptively configuring and deploying honeypots in user compute resources. The methods select, based at least in part on a profile associated with a user account, a virtual machine image having a type and associated with a countermeasure. Cause a virtual machine to be launched in connection with a virtual network associated with the user account.

20 Claims, 8 Drawing Sheets

ADAPTIVE CONFIGURATION AND DEPLOYMENT OF HONEYPOTS IN VIRTUAL NETWORKS

BACKGROUND

In general, computing devices can utilize a communication network, or a series of communication networks, to exchange data. Companies and organizations often operate computer networks that interconnect a number of computing devices to support operations or provide services to third parties. The computing systems may be located in a single geographic location or located in multiple, distinct geographic locations (e.g., interconnected via private or public communication networks). Specifically, data centers or data processing centers, sometimes referred herein as a "data center," may include a number of interconnected computing systems to provide computing resources to users of the data center. The data centers may be private data centers operated on behalf of an organization or public data centers operated on behalf of, or for the benefit of, the general public.

To facilitate increased utilization of data center resources, virtualization technologies can allow a single physical computing device to host one or more instances of virtual machines that appear and operate as independent computing devices to users of a data center. The single physical computing device may create, maintain, delete, or otherwise manage virtual machines in a dynamic manner. In some scenarios, various computing devices can be associated with different combinations of operating systems or operating system configurations, virtualized hardware resources and software applications to enable a computing device to provide different desired functionalities, or to provide similar functionalities more efficiently. Further, virtual machines can themselves be partitioned into multiple isolated virtual systems, sometimes referred to as "containers." The virtual machine controls allocation of resources such as processing power and memory, and each container has its own process and network space in which the container may, for example, execute software programs. In such a system, a service provider may provide virtual machine resources to many different users, and can operate disparate physical computing devices that communicate with each other and with external resources over any number of networks and sub-networks of varying types.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
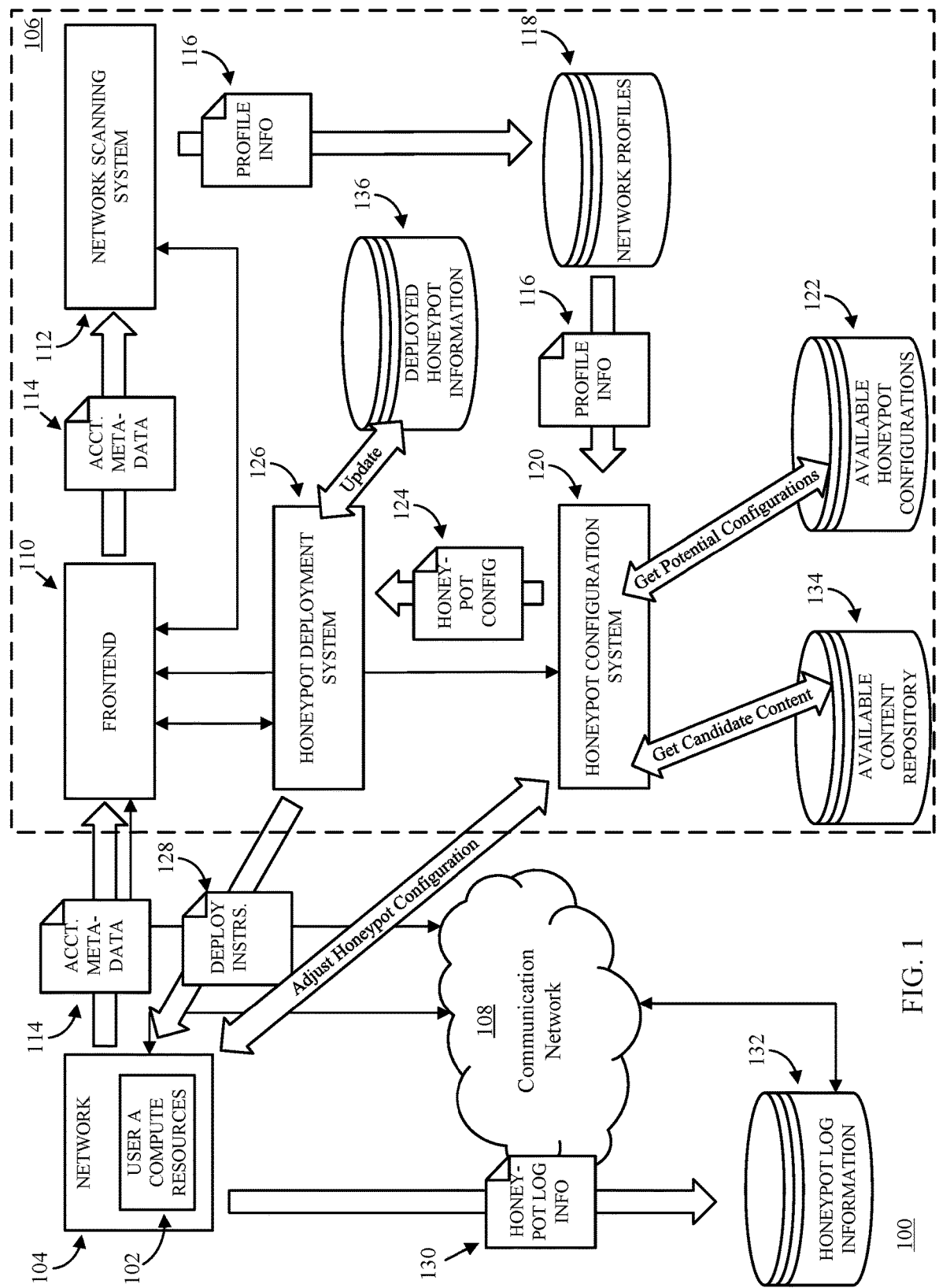
FIG. 1 is a diagram of an example system for adaptively configuring and deploying honeypots in accordance with some embodiments of the disclosed subject matter.

A service provider can supply computing resources to developers and/or other users that can use the computing resources to provide computing environments, such as a virtual network, that can be used to perform computing operations (e.g., providing access to web pages, applications, services, a database, etc.). For example, in many cases developers create virtual machine instances of different types that run specific software that configures the virtual machine to serve a primary function. Such types can include, a type that performs a router function, a type that performs a web server function, a type that performs a load balancer function, a type that performs a database function, a type that performs a storage node function, a type that performs a file system function, a type that performs a business logic function, etc. As with networked physical computing systems, such as personal computers, servers, data centers, etc., such systems may be the target of malicious user's attempting to infiltrate the networked devices. Accordingly, compute resources provided as a service may require monitoring and/or countermeasures to attempt to protect user's systems from potentially malicious activity. In some cases, the service provider may wish to offer security services in connection with the computing resources and other networking infrastructure provided to users. For example, the service provider may offer a service that assists the user in deploying honeypot devices (e.g., devices that are configured and deployed to detect, deflect, and/or otherwise mitigate unauthorized access to a computing system) in connection with the user's virtual network. Such honeypot devices can be configured to appear to be similar to another device (or devices) on a user's network, and can be implemented in the network so that a typical user of the user's virtual network would be unlikely to interact with the honeypot. Additionally, the honeypot can be configured to draw the attention of potentially malicious user, for example, by having more lax security measures or by making it appear that the honeypot could grant access to sensitive information. In some cases, a honeypot can draw at least a portion of an attacker's attention from the user's other systems. Interaction with the honeypot can indicate that unusual behavior on the virtual network may be due to a potentially malicious user, as typical users are unlikely to interact with the honeypot. Additionally, the time and/or effort expended by the potentially malicious user in trying to access or otherwise compromise the honeypot may reduce the amount of damage an attacker can do before the user is able to secure the virtual network against the attacker.

However, deploying honeypots that are not easily detectable by malicious users can be a difficult and time consuming task. Many attackers are aware that users may deploy honeypots in their network, and accordingly, some attackers try to quickly determine whether a device is a honeypot to avoid wasting effort interacting with such a device. For example, an attacker may become suspicious if a honeypot device or its data does not resemble the user's other devices and data (e.g., by using a different operating system, using a different naming scheme, including very limited data, including data that is dissimilar in format or content to data that the attacker expects, etc.). As another example, if honeypots are not sufficiently customized, attackers may begin to recognize some property that gives away that a device is a honeypot. While some users may be sophisticated enough to properly configure a honeypot so that it is not easily detectable by a malicious user, other user's lack the sophistication or resources to do so. Additionally, users with large and/or diverse network environments may have to spend a significant amount of time and money configuring honeypots for all the different portions of their network in order to provide the level of benefit they desire from deploying the honeypots.

Accordingly, it would be advantageous if the service provider could analyze the configuration of the user's network, and configure honeypots devices for deployment in connection with the user's network. The present disclosure describes implementable concepts and specific examples of a system for adaptive configuration and deployment of honeypots in virtual networks. As described below, the system for adaptively configuring and deploying honeypots in virtual networks can receive a request from a user to analyze the user's virtual network configuration, and configure honeypot devices that are similar to other computing devices on the user's network. For example, the system for adaptively configuring and deploying honeypots can be associated with a service that the user can interact with to deploy honeypots on the user's network. In a more particular example, the user can submit a request to begin a process for configuring and deploying honeypots on the user's virtual network to an application program interface ("API") associated with the service for adaptively configuring and deploying honeypots. In such an example, the user can be required to explicitly grant permission to the system for adaptively configuring and deploying honeypots to build a profile of a portion of the user's virtual network in which the user wishes to the honeypots. Additionally, the user can be required to explicitly grant permission to the system for adaptively configuring and deploying honeypots to make changes to the configuration of the user's compute resources in order for the system to be permitted to profile the user's virtual network (e.g., by performing a scan) and/or to deploy the honeypots to the user's virtual network.

In some embodiments, the system for adaptively configuring and deploying honeypots can create a profile or the user's virtual network (or a portion of the user's virtual network) by scanning the user's virtual network. For example, the system for adaptively configuring and deploying honeypots can interrogate the user's virtual network using discovery protocols to establish identifying information of computing devices in the user's virtual network. As another example, the system for adaptively configuring and deploying honeypots can scan ports on discovered computing devices. As yet another example, the system for adaptively configuring and deploying honeypots can request that the user install an agent on at least a portion of the computing devices in the virtual network that the user wishes to be included in the profile. In some embodiments, the system for adaptively configuring and deploying honeypots can periodically (at regular and/or irregular intervals) analyze at least a portion of the user's virtual network to determine whether any changes have been made to the virtual network.

In some embodiments, after generating profile information about the user's compute resources, the system for adaptively configuring and deploying honeypots can use the profile information to select one or more honeypots from a group of preconfigured honeypot templates (e.g., implemented as virtual machine images) that are similar to the devices currently deployed in the user's virtual network. For example, the system for adaptively configuring and deploying honeypots can select preconfigured honeypot templates that use the same operating system(s), and the same programming language(s). As another example, the system for adaptively configuring and deploying honeypots can select preconfigured honeypot templates that are associated with similar types of applications. As yet another example, the system for adaptively configuring and deploying honeypots can select preconfigured honeypot templates that correspond to the same type of virtual machine and/or provide the same function(s) (e.g., a web server, an email server, a file server, etc.).

In some embodiments, after selecting preconfigured honeypot templates, the system for adaptively configuring and deploying honeypots can further configure the honeypots with properties that are similar to properties of the instance that was analyzed. For example, by using similar naming schemes, by assigning Internet Protocol ("IP") addresses to the honeypots that are similar to IP addresses used in the network (e.g., within the same CIDR block), etc. Additionally, in some embodiments, the system for adaptively configuring and deploying honeypots can configure the honeypots to be deployed in a network configuration that resembles the network configuration of the user's other similar devices on the virtual network.

In some embodiments, the system for adaptively configuring and deploying honeypots can deploy the configured honeypots in connection with the user's virtual network. For example, the system for adaptively configuring and deploying honeypots can send instructions to an API (e.g., exposed by a service that the user can interact with to configure the user's compute resources) that can be called to implement changes to the user's compute resources. In such an example, the system for adaptively configuring and deploying honeypots can require permissions to submit such API calls on behalf of the user. As another example, the system for adaptively configuring and deploying honeypots can deploy the honeypots to compute resources associated with a provider of the system for adaptively configuring and deploying honeypots, and can deploy a computing device to the user's virtual network to act as a proxy connecting the deployed honeypots to the user's virtual network.

In some embodiments, if the virtual network has been changed enough so that it no longer resembles the deployed honeypots, the system for adaptively configuring and deploying honeypots can decommission one or more of the deployed honeypots and/or select and configure new honeypots for deployment to the user's virtual network. In some embodiments, the system for adaptively configuring and deploying honeypots can periodically (e.g., at regular and/or irregular intervals) determine whether there has been a change to the virtual network (e.g., based on a new scan of the network, accessing a data store of the service managing the virtual network to obtain metadata about how the virtual network is configured, etc.), and can determine whether the network configuration of the deployed honeypots is similar to the new configuration of the virtual network. For example, in some embodiments, the system for adaptively configuring and deploying honeypots can associate each deployed honeypot with one or more portions of the virtual network, such as a subnet. In such an example, when the system for adaptively configuring and deploying honeypots determines that the virtual network has changed, the system for adaptively configuring and deploying honeypots can determine whether the portion of the virtual network that has changed is associated with a deployed honeypot, and change the deployment of honeypots based on the changes to the virtual network, FIG. 1 depicts an example of a system 100 for adaptively configuring and deploying honeypots in accordance with some embodiments of the disclosed subject matter. As shown in FIG. 1, in some embodiments, system 100 can include compute resources 102 associated with a particular user (e.g., "user A") of a compute service. In some such embodiments, the user can be a person (e.g., a developer, a website administrator, an application administrator, etc.) and/or an entity (e.g., a corporation, a non-profit organization, etc.). In some embodiments, compute resources 102 can include instances, such as virtual machine instances, or instances that run directly on hardware of, for example, a server (e.g., bare metal instances). Additionally, in some embodiments, compute resources 102 can act programmatically to perform one or more actions. Although shown and described as resources provided through a compute service, compute resources 102 can be any suitable computing device or combination of computing devices. For example, compute resources 102 can include physical computing devices associated with a user that are not provided through the compute service (e.g., a personal computer, a laptop computer, a server, a smartphone, a tablet computer, a wearable computer, etc.), and virtual computing devices provided through a different platform (e.g., a different compute service).

In some embodiments, compute resources 102 can be part of a network 104 which can include one or more physical networks (e.g., which can be owned and/or operated by the user associated with compute resources 102) and/or one or more virtual networks (e.g., which can be provided by physical computing devices made available by a service provider) including compute resources made available to the user through a compute service. For example, network 104 can include any suitable number of virtual (and/or physical) machines that can be arranged in a network for performing one or more actions (e.g., providing access to web pages, applications, services, a database, etc.). In some embodiments, compute resources 102 104 can include compute resources that are available to the user as a service, such as an electronic data storage service, a network-accessible services system that can perform one or more on-demand functions, a load balancing service, a database management service, etc. In such cases, compute resources are not necessarily in network 104. For example, such compute resources can be on a different network (e.g., compute resources in a network provided by the service provider of the virtual network, but which are not included as part of network 104 that is associated with the user, a service provider of other compute resources, etc.). In some embodiments, network 104 (e.g., a virtual network portion of network 104) can include compute resources provided by a single physical computing device, by a single data center, by a group of interconnected data centers (e.g., by low latency communication links), by groups of interconnected data centers that are not directly connected to other groups of data centers (but that may be connected via a wide area network, such as the Internet). Additionally, in some embodiments, network 104 can be organized into different subnets, some of which may physically and/or logically isolated from one another.

In some embodiments, compute resources 102 can interact with a honeypot configuration and deployment service (sometimes referred to herein as a "honeypot configuration service") that is provided, at least in part, by a computing environment 106 to deploy one or more honeypots that are configured to resemble one or more portions of network 104 (e.g., the honeypot instances can resemble compute resources of the user and be arranged into a network topology that resembles the network of the user). In some embodiments, compute resources 102 can interact with a frontend 110 using a communication network 108 to submit requests and/or instructions to the honeypot configuration service. For example, compute resources 102 can submit a request to begin setting up the honeypots within network 104 or in the user's resources (e.g., the honeypot configuration service may insert honeypots into databases or storage repositories of the user). As another example, compute resources 102 can submit a request to the honeypot configuration service to perform a scan of at least a portion of network 104 to build a profile of at least that portion of network 104. As yet another example, compute resources 102 can submit instructions to the honeypot configuration service indicating which portion(s) of virtual network is to be scanned, portion(s) of network 104 and/or subnet(s) in which the honeypot configuration service can deploy honeypots, etc.

In some embodiments, communication network 108 can be any suitable wired network, wireless network, any other suitable network, or any suitable combination thereof. Additionally, communication network 108 can be any suitable personal area network, local area network, wide area network, over-the-air broadcast network (e.g., for radio or television), cable network, satellite network, cellular telephone network, any other suitable type of network, or any suitable combination thereof. For example, communication network 108 can include a publicly accessible network of linked networks, in some cases operated by various distinct parties, such as the Internet. In some embodiments, communication network 108 can include a private or semi-private network, such as a corporate or university intranet. Additionally, in some embodiments, communication network 108 can include one or more wireless networks, such as a Global System for Mobile Communications ("GSM") network, a Code Division Multiple Access ("CDMA") network, a Long Term Evolution ("LTE") network, any other suitable wireless network, or any suitable combination of wireless networks. Communication network 108 can use any suitable protocols and/or components for communicating via the Internet and/or any of the other aforementioned types of networks. For example, communication network 108 can use one or more protocols or combinations or protocols, such as Hypertext Transfer Protocol ("HTTP"), HTTPS, Message Queue Telemetry Transport ("MQTT"), Constrained Application Protocol ("CoAP"), etc.

In some embodiments, among other things, frontend 110 can provide a user interface (e.g., a webpage, an application, etc.) that can be presented to a user of compute resources 102, and the user can manually select and/or provide information that can be used to build a profile of one or more portions of network 104. Additionally or alternatively, a user of compute resources 102 can authorize the honeypot configuration service to scan one or more portions of network 104 (and/or request information from a system and/or service providing compute resources 102 about the configuration of network 104) to gather information that can be used to build a profile of the one or more portions of network 104. In some embodiments, the honeypot configuration service can use a network scanning system 112 to perform an analysis (e.g., a scan) of network 104 and/or to request information from a provider of compute resources 102. For example, network scanning system 112 can, with permission explicitly granted by the user, send one or more messages to network 104 to discover devices, instances, and/or services included in at least a portion of network 104, and/or request information from a control service for the virtual network describing the devices, instances, and/or services, in network 104.

As another example, network scanning system 112 can submit requests for information about virtual network to an API made available by a provider of compute resources 102. In such an example, the API can implement API calls for gathering information about resources deployed in network 104. In a more particular example, network 104 can include one or more virtual machines provided through a compute resources virtualization platform, and an API made available in connection with the compute resources virtualization platform can support API calls that allow a computing device with the proper permissions (e.g., credentials, security certificate, encryption key, etc.), to request information about virtual machines associated with a particular user and/or a particular virtual network.

As yet another example, network scanning system 112 can install and/or launch one or more applications (and/or virtual machines) within network 104 that can gather information about the configuration of network 104. Additionally or alternatively, network scanning system 112 can instruct a user to install and/or launch one or more applications (and/or virtual machines) within network 104. In some embodiments, such applications and/or virtual machines can gather information and send it to a destination specified by network scanning system 112 (e.g., an electronic data store, a database, an API, etc.). As described below in connection with FIG. 2, network scanning system 112 can use any suitable technique or combination of techniques to gather information about network 104. Note that, in some embodiments, a user of compute resources 102 can authorize network scanning system 112 (and/or any other suitable portion of the honeypot configuration service) to submit API calls to an API provided by the provider of compute resources 102 (and/or any other suitable mechanism made available by the provider to gather information about network 104). For example, compute resources 102 can provide credentials or other information that can be used to convey authorization (e.g., a security certificate, an encryption key, etc.) to the honeypot configuration service (e.g., through frontend 110) that can be used to gather information from the provider of compute resources 102. As another example, compute resources 102 can provide identifying information associated with network scanning system 112 (and/or any other portion of the honeypot configuration service) to the provider of compute resources 102 authorizing network scanning system 112 to gather information about network 104.

In some embodiments, information about network 104 can be account metadata 114 which can include any suitable information about network 104, and can be received from any suitable source (e.g., a virtual machine within network 104, an API associated with the provider of compute resources 102, a computing device, such as a web server, associated with the provider of compute resources 102). For example, account metadata 114 can include information about computing device (e.g., virtual machines) that are deployed within network 104. As another example, account metadata 114 can include information about services being used in connection with network 104. As yet another example, account metadata 114 can include information about network interfaces used by computing devices in virtual network and/or identifying information associated with the network interfaces (e.g., IP address information). As still another example, account metadata 114 information about a network configuration of computing devices and/or services within network 104. In some embodiments, account metadata 114 can communicated to network scanning system 112 (e.g., from compute resources 102, the provider of compute resources 102, etc.) via communication network 108 through frontend 110.

In some embodiments, frontend 110 can receive and process messages from compute resources 102 and/or any other suitable computing device. For example, in some embodiments, frontend 110 can serve as a "front door" to the honeypot configuration service (as well as any other systems and/or services provided in connection with the honeypot configuration service), such as network scanning system 112, a honeypot configuration system 120, and/or a honeypot deployment system 126. Frontend 110 can process messages received from compute resources 102 and/or generated, for example, in response to events (e.g., when compute resources 102 enters information into a user interface provided via frontend 110), and can determine whether the messages are properly authorized. For example, frontend 110 can determine whether a user and/or computing device associated with the message is authorized to request that changes be made to compute resources 102, and/or is authorized to grant permissions to others (e.g., network scanning system 112, honeypot deployment system 126, etc.) to request information about at least a portion of compute resources 102 and/or to make changes to at least a portion of compute resources 102 (e.g., corresponding to a portion of network 104). In some embodiments, frontend 110 can include one or more APIs that can receive messages as API calls (e.g., from compute resources 102 and/or any other suitable computing device). As such, in some embodiments, frontend 110 can effectuate one or more APIs for interacting with the honeypot configuration service (and/or any portions thereof), such as one or more APIs for authorizing the service provider to deploy one or more honeypots, providing information about the configuration of network 104, configuring the type of honeypot(s) to deploy (e.g., web server, database, email, etc.) and/or properties of the honeypot(s) (e.g., OS, security rules, network interfaces, runtime libraries, etc.), configuring where in network 104 the honeypot(s) can be deployed.

In some embodiments, frontend 110 can provide account metadata 114 to network scanning system 112, which can generate profile information 116 about at least a portion of network 104 based on account metadata 114. For example, network scanning system 112 can determine what types of virtual machine instances are deployed in network 104 (e.g., an OS, a version of the OS, programming languages, function(s), etc.). As another example, network scanning system 112 can determine what types of services are being used by network 104 (e.g., a compute resources virtualization platform, a load balancing service, a virtual network communication logging service, etc.). As yet another example, network scanning system 112 can determine configuration information of at least a portion of network 104. As still another example, network scanning system 112 can determine information about security rules used in connection with virtual machines in network 104, subnets within network 104, and/or network 104 itself.

In some embodiments, network scanning system 112 can create and/or update one or more entries in a network profile database 118. Although described as a database, in some embodiments, network profile database 118 can be any suitable data structure. For example, network profile database 118 can be a relational database or a non-relational database. As another example, network profile database 118 can be an electronic data store having a file system in which profile information (e.g., profile information 116) for various users' virtual networks are stored (e.g., as documents).

In some embodiments, network scanning system 112 can periodically (e.g., at regular and/or irregular intervals) analyze network 104 (and/or cause network 104 to be analyzed). For example, network scanning system 112 can analyze at least a portion of network 104 if an analysis has not been performed within a particular period of time (e.g., within the last day, week, month, etc.). As another example, network scanning system 112 can analyze at least a portion of network 104 when network scanning system 112 determines that there was likely a change to the configuration of network 104 (e.g., in response to a signal indicating a new VM was launched or terminated, or the virtual network was changed). In a more particular example, network scanning system 112 can (with explicit permission from the user) monitor log information related to changes to at least a portion of network 104 (e.g., submitted via an API associated with a provider of the compute service providing a portion of a virtual network within network 104) such as deployment of software applications to one or more virtual machine instances, changes to add and/or remove virtual machine instances from the virtual network. As another more particular example, network scanning system 112 can (with explicit permission from the user) monitor log information about network activity on at least a portion of the user's virtual network for changes that may indicate a change to the underlying network structure.

As yet another example, network scanning system 112 can receive information (e.g., via frontend 110) indicating that the configuration of network 104 changes on a relatively regular schedule (e.g., based on a period computational task performed by the user, based on external events that drive traffic to network 104 at particular times, etc.). In such an example, network scanning system 112 can analyze (e.g., scan the virtual network or query a database) at least a portion of network 104 when the network configuration is likely to be different.

In some embodiments, network scanning system 112 (and/or any other suitable system) can evaluate content stored in connection with network 104 (e.g., that is accessible through one or more virtual machine instances in network 104). For example, in some embodiments, a user associated with compute resources 102 can grant permission to network scanning system 112 to access one or more electronic data stores associated with compute resources 102 (e.g., electronic data store 312 described below in connection with FIG. 3). In such an example, network scanning system 112 can access the electronic data store to gather information about the user's content, such as organization (e.g., organization of the file system), naming conventions, the amount of content that the virtual machine instance has access to, etc. As another example, a user associated with compute resources 102 can grant permission to network scanning system 112 to take a snapshot of the user's content that is stored using a storage service (e.g., that is provided by the same service provider that provides the compute service). As yet another example, a user associated with compute resources 102 can supply (and/or grant access to) a sample of content stored in connection with one or more portions of network 104.

In some embodiments, network scanning system 112 can use any suitable technique or combination of techniques to determine how the user's content is organized and/or formatted. For example, network scanning system 112 can use one or more natural language processing techniques to identify naming conventions used to identify the user's content. As another example, network scanning system 112 can use one or more pattern recognition natural language processing techniques or services to identify the types of information included in the user's content (e.g., phone numbers, email addresses, social security numbers, names, credit card numbers, account numbers, etc.). In some embodiments, information about the user's content (e.g., a file system, information about a naming convention, information on the format of content, etc.), can be incorporated into profile information 116 and/or otherwise stored in network profile database 118 in connection with the user.

In some embodiments, honeypot configuration system 120 can use at least a portion of profile information for a virtual network (e.g., profile information 116 generated by network scanning system 112) to identify one or more honeypot configurations that may be suitable for deployment into network 104. For example, honeypot configuration system 120 can access at least a portion of profile information (e.g., profile information 116) about network 104 from network profile database 118, and can use the information to identify potentially suitable configurations. As another example, honeypot configuration system 120 can receive profile information from network scanning system 112. As yet another example, honeypot configuration system 120 can receive profile information from compute resources 102 (and/or any other suitable computing device associated with a user of compute resources 102) submitted via frontend 110 (e.g., using an API, using a graphical user interface provided via a webpage or application, etc.).

In some embodiments, honeypot configuration system 120 can use any suitable technique or combination of techniques to identify potentially suitable honeypot configurations. For example, in some embodiments, honeypot configuration system 120 can retrieve information from a repository of available honeypot configurations 122 using the profile information. In such an example, honeypot repository 122 can include information about preconfigured honeypot templates that can be used to provide a honeypot customized for network 104, and/or information that can be used to deploy the preconfigured honeypot templates (e.g., virtual machine images, software images, an executable file, source code, machine code, etc.). In such an example, honeypot configuration system 120 can use properties of one or more virtual machine instances (e.g., which type of function(s) are being performed) being used in network 104 to query a database for honeypot configurations that are compatible with the virtual machine instance. In a more particular example, if the virtual machine instance uses a particular operating system, such as Linux, honeypot configuration system 120 can query honeypot repository 122 for preconfigured honeypot templates that use the Linux operating system. Software images can, for example, represent the entire state of a software application at the time it was imaged, such that the software application can be restored to that point by restoring/launching the software image. Additionally, virtual machine images can, for example, represent the entire state of a virtual machine instance at the time it was imaged, such that a virtual machine instance and any software applications installed on the virtual machine instance can be restored to this point by restoring/launching the virtual machine image.

As another more particular example, if the virtual machine instance uses a particular programming language, such as Python, honeypot configuration system 120 can query honeypot repository 122 for preconfigured honeypot templates that use Python. As yet another example, if the virtual machine instance is configured to provide a particular function, such as a web server function, honeypot configuration system 120 can query honeypot repository 122 for preconfigured honeypot templates that are configured to perform, or appear to perform, the functions of a web server by adding web server providing software to the honeypot, configuring firewall ports to accept traffic from the Internet, etc. In some embodiments, honeypot configuration system 120 can using structured queries of any suitable complexity to search honeypot repository 122. For example, honeypot configuration system 120 can search for preconfigured honeypot templates having multiple properties, such as a particular combination of operating system, programming language, and function(s). As another example, honeypot configuration system 120 can receive user input (e.g., through a graphical user interface, through a command line interface, as part of an API call, etc.) indicating one or more properties that the user has identified as being important (e.g., an OS, a programming language, applications, etc.). In such an example, honeypot configuration system 120 can search for preconfigured honeypot templates that include the one or more properties specified by the user.

In some embodiments, if multiple preconfigured honeypot templates are available that match the same properties of the virtual machine instance, honeypot configuration system 120 can determine which among the matching honeypots would arouse the least suspicion from an attacker (i.e., that is the closest match for the virtual machine instance). For example, if there are multiple preconfigured honeypot templates that match the operating system and function of the virtual machine instance, but none match the programming language, honeypot configuration system 120 can select a preconfigured honeypot template that has a programming language that resembles the programming language of the virtual machine instance and/or a programming language that is used by a similar virtual machine instance elsewhere in virtual network. As another example, honeypot configuration system 120 can present two or more options to a user that match the same number of properties, and prompt the user to select at least one of the preconfigured honeypots to deploy or the service can pick one at random. In a more particular example, honeypot configuration system 120 can present information identifying (and/or any other suitable properties) of a virtual machine instance (or service) in network 104 that the honeypot to be selected is intended to match.

In some embodiments, honeypot configuration system 120 can determine, for each virtual machine instance in network 104 a closest match among preconfigured honeypot templates in honeypot repository 122. In some embodiments, honeypot configuration system 120 can use any suitable technique or combination of techniques to determine which among a variety of potentially matching preconfigured honeypot templates most closely matches a particular virtual machine instance in network 104. For example, in some embodiments, honeypot configuration system 120 can use a trained neural network that identifies a closeness of match between a property of a virtual machine instance and a property of a preconfigured honeypot template. As another example, honeypot configuration system 120 can use predetermined relationships (e.g., developed by one or more experts, developed using machine learning techniques, etc.), which can assign a score to each property of a preconfigured honeypot template indicating how similar that property is to a property of a virtual machine instance in network 104. In such an example, a score can be generated for various preconfigured honeypot templates based on a weighted combination of scores for individual properties.

In some embodiments, honeypot configuration system 120 can determine whether security rules associated with the virtual machine instance are compatible with security rules of a preconfigured honeypot template that is a potential match (e.g., which ports are open, whether any particular protocols are disabled, etc.). In some embodiments, if honeypot configuration system 120 identifies a particular preconfigured honeypot template as being a closest match, but the security rules of the virtual machine instance are incompatible with the security rules of the preconfigured honeypot template, honeypot configuration system 120 can identify a next best match (or matches), and multiple options can be presented to the user. For example, the user can be presented with a choice of a preconfigured honeypot template that has all ports open (e.g., as a match with a virtual machine instance that only exposes port 80), or choosing a preconfigured honeypot template that is otherwise less closely matched to the virtual machine instance. Additionally or alternatively, in some embodiments, honeypot configuration system 120 can modify the security rules to be applied to the honeypot to be launched from the preconfigured honeypot template and/or network interfaces associated with the honeypot to be launched from the preconfigured honeypot template to more closely match security rules of the virtual machine instance. For example, if the preconfigured honeypot template has security rules that allow connections to all ports, honeypot configuration system 120 (and/or honeypot deployment system 126, described below) can modify security rules of a network interface to be attached to the honeypot to be launched from the preconfigured honeypot template to block connections to ports that are not open on the virtual machine instance.

Additionally, in some embodiments, honeypot configuration system 120 can modify the security rules to be applied to the honeypot to be launched from the preconfigured honeypot template and/or network interfaces associated with the honeypot to be launched from the preconfigured honeypot template to more closely match security rules of the virtual machine instance. For example, security rules for a honeypot corresponding to a web server can be modified to allow anonymous connections. As another example, security rules for a honeypot corresponding to a server can be modified to open an additional port. As yet another example, a honeypot can be configured to use a default (or no) password. As still another example, a honeypot can be configured to allow access to an administrative panel of an application installed on the honeypot (e.g., that is not installed on the corresponding virtual machine instance). In some embodiments, the security rules applied to honeypots can be preconfigured and/or can be modified before deployment (e.g., by honeypot deployment system 126, described below).

Additionally, in some embodiments, a user can be prompted to identify a level of security to apply to honeypots representing one or more portions of network 104. For example, in some embodiments, the user can be prompted to select what type of attacker they want to be able to access the honeypots (e.g., a bot, a typical attacker, a sophisticated attacker, a state sponsored attacker, etc.), and security rules can be tailored to the type of attacker (e.g., by modifying the security rules, by selecting honeypot templates corresponding to the selected type of attacker, etc.). As another example, the user can be prompted to select a level of difficulty, indicating the amount of effort and/or sophistication required to compromise the honeypot. In some embodiments, preconfigured honeypot templates in honeypot repository 122 can be associated with a level of difficulty to breach the honeypot, and/or an indication of which types of attackers are most likely to be able to breach the honeypot.

In some embodiments, honeypot configuration system 120 can similarly identify potentially suitable honeypot configurations corresponding to services used in network 104. For example, if network 104 includes load balancing as a service, honeypot configuration system 120 can identify one or more honeypot configurations that can simulate the function of the load balancing service (e.g., to distribute traffic to one or more honeypots giving the appearance of a cluster of virtual machine instances). As another example, if network 104 includes a database that is accessed via a service, honeypot configuration system 120 can identify one or more honeypot configurations that can simulate the function of the database. Additionally or alternatively, in some embodiments, honeypot configuration system 120 can subscribe to the same service in connection with honeypots that are to be deployed. In some embodiments, honeypot configuration system 120 can supply content that can be accessed through the service by one or more honeypots (e.g., a table to be used by a database service accessible through a honeypot, where the content of the table is configured to be similar to the format of data used by the corresponding database in network 104).

In some embodiments, honeypot configuration system 120 can use profile information 116 to determine a network configuration in which selected preconfigured honeypot templates are to be deployed in connection with network 104. For example, as described below in connection with FIG. 3, a particular virtual network may include a group of instances used to provide a web application to end users. Such a configuration can include a cluster of virtual machine instances acting as web servers, which connect with a cluster of virtual machine instances acting as application servers, which access files from an electronic data store and retrieve information from a database server. In such an example, honeypot configuration system 120 can determine a network configuration for a group of preconfigured honeypot templates matching those virtual machine instances that provides a similar network configuration.

In some embodiments, honeypot configuration system 120 can select parameters for network interfaces (e.g., virtual network interfaces) to use in connection with the preconfigured honeypot templates, based on properties of network interfaces used by corresponding virtual machine instances in network 104. For example, honeypot configuration system 120 can select a subnet to which a network interface is to be attached, a number of network interfaces to assign to the honeypot, security rules to be associated with each network interface, etc.

In some embodiments, honeypot configuration system 120 can generate honeypot configuration information 124 that can be used to implement a honeynet (i.e., a network of honeypots) in network 104 based on the preconfigured honeypot templates identified by honeypot configuration system 120 as most closely matching the virtual machine instances and network architecture in network 104 (or the portion(s) of network 104 being addressed). In some embodiments, honeypot configuration information 124 can include a single proposed configuration of honeypots in a particular network configuration. For example, honeypot configuration information 124 can include the closest match for each virtual machine instance in a network configuration that most closely approximates the network configuration of at least a portion of network 104. In such an example, the user can be presented with honeypot configuration information 124 for approval (or denial) prior to deploying honeypots to network 104. In some embodiments, the user can be provided with a user interface (e.g., through frontend 110) to make certain adjustments to settings of the preconfigured honeypots and/or network configuration, and can select one or more honeypots or groups of honeypots that the user does not wish to be deployed. In some embodiments, such a user interface can include information indicating the resources that would be used if honeypots are deployed as depicted in a plan presented using honeypot configuration information 124. Additionally or alternatively, in some embodiments, the user interface can include information indicating the predicted cost of deploying the honeypots depicted in a plan presented using honeypot configuration 124. For example, the cost can be based on the resources that would likely be used, and the cost that such resource use would incur (e.g., if network 104 is implemented, at least in part, using metered compute resources).

Alternatively, in some embodiments, honeypot configuration 124 can include multiple options, either as complete plans among which a user can choose a preferred plan, or as a dynamic plan that the user can manipulate. In some such embodiments, the plans presented using honeypot configuration 124 can be presented with the resources and/or costs of implementing the plan in network 104.

In some embodiments, a user can make adjustments to honeypot configuration information 124 that the user believes will make the honeypots match the deployment of virtual machines (and/or services) in network 104. For example, the user can interact with honeypot configuration system 120 to specify any additional parameters that have not yet been configured, to specify runtime libraries to use with particular virtual machine instance, to specify content to be presented (e.g., code for a welcome page when the honeypot is accessed, other web pages that the honeypot can present, etc.). As another example, the user can interact with honeypot configuration system 120 to specify whether a current configuration of network 104 (or at least the portion that is scanned by network scanning system 112) represents the typical configuration, or whether the configuration changes at particular times. In some embodiments, the user can interact with honeypot configuration system 120 using any suitable technique or combination of techniques. For example, the user can enter information through a user interface presented by frontend 110 to specify parameters to change, properties to add, particular honeypots that should not be used, to choose between alternate honeypots, etc. As another example, honeypot configuration system 120 can present configuration information by sending (or otherwise making available) a document specifying proposed honeypot configuration information, which the user can edit submit back to honeypot configuration system 120 via frontend 110. In some embodiments, honeypot configuration information 124 can be presented in the format of a template that users of compute resources such as compute resources 102 can use to launch a network of virtual machine instances and/or services in a configuration specified by the template.

In some embodiments, compute resources 102 can be configured to respond to certain queries from honeypot configuration system 120 without user intervention. For example, the user can configure an API (e.g., through a graphical user interface, through a command line interface, through a script, etc.) to respond to particular API calls from honeypot configuration system 120. In such an example, honeypot configuration system 120 can configure new honeypots for deployment without user intervention (e.g., when changes to network 104 have been detected by network scanning system 112). In some embodiments, the API associated with a virtual portion of network 104 can be implemented using a network-accessible services system that can be configure to perform one or more on-demand functions that respond to calls from honeypot configuration system 120.

In some embodiments, honeypot configuration system 120 can provide honeypot configuration information 124 to honeypot deployment system 126, which can prepare instructions 128 to deploy the network of honeypots specified by honeypot configuration information 124. In some embodiments, honeypot deployment system 126 can deploy honeypots specified by honeypot configuration information 124 by, for example, calling an API made available by the service provider through which compute resources 102 are provided. For example, honeypot deployment system can call the API for each honeypot to be deployed with information identifying a virtual machine image and/or one or more software images that are to be used to deploy that particular honeypot. In such an example, the API call to deploy the honeypot can be similar (or identical) to an API call that the user associated with compute resources 102 can make to deploy a virtual machine instance in network 104. In some embodiments, honeypot deployment system 126 can specify a location at which the honeypot is to be deployed (e.g., a region, availability zone, subnet, etc.). Additionally, in some embodiments, honeypot deployment system 126 can make API calls to create and/or attach one or more network interfaces (e.g., virtual network interfaces) to the honeypot. Such network interfaces can be associated with security rules that restrict communications to and/or from the honeypot through the network interface. In some embodiments, as described below in connection with FIGS. 4A and 4B, a virtual machine instance can be attached to multiple network interfaces, which can each have different properties (e.g., security rules, IP addresses, etc.).

In some embodiments, after being deployed in network 104, the honeypots can execute software intended to give the appearance that the honeypots are actually other devices. For example, a honeypot configured to be similar to a virtual machine instance acting as a web server can include a daemon that accepts HTTP communications on port 80, responds to certain types of communications with data provisioned by the honeypot configuration service, provides access to other services (e.g., a database, an application server, a file system, etc.). Additionally, in some embodiments, one or more of the honeypots that are deployed can be configured to monitor operations of the honeypot, and/or operation of a computing device (e.g., a virtual machine instance) executing the software. As another example, the honeypot can be configured to log particular information about the activity and/or processes associated with the honeypot. In a more particular example, the honeypot can log the origin of a communication (e.g., an IP address), the content of the communication, whether a response was provided to the communication, any activity that was caused by the command, etc. In some embodiments, monitoring and/or event logging software can be deployed as part of the honeypot and/or can be deployed in connection with the honeypot. For example, as described below in connection with FIG. 6, event logging software can be deployed to execute on the same virtual machine instance that is executing a daemon to emulate the function of one or more virtual machine instances in the user's production environment, using the same operating system. As another example, the event logging software can be deployed as software that is executed outside the virtual machine instance instantiating the honeypot (e.g., the honeypot can be implemented in an isolated environment within a virtual machine instance that is executing the event logging software). In a more particular example, the event logging software can be executed using a first set of containers on virtual machine instance, and the honeypot functionality can be provided by another set of containers on the virtual machine instance that are isolated from the first set of containers. As yet another example, the event logging software can be deployed outside of the virtual machine instance being used to implement the honeypot (e.g., the event logging software can be deployed on another virtual machine instance that is connected to the virtual machine instance on which the honeypot is implemented, and can intercept communications to and from the sensor). In some embodiments, the event logging software can monitor activity and/or processes using any suitable technique or combination of techniques. For example, the event logging software can implement a network tap to capture and relay traffic to and/from the honeypot. As another example, the event logging software can track changes to system files, running processes, files in a filesystem, requests, login attempts, etc., of the honeypot and/or the virtual machine instance on which the honeypot is implemented. In some embodiments, the event logging software can be software that is associated with virtual machine instances in network 104 for reporting activity and/or the state of the virtual machines. For example, such event logging software can be deployed as part of the compute service providing access to compute resources 102. In a more particular example, event logging software can be software made available by the compute service to generate log information that can be used by a user associated with compute resources 102 to monitor and/or analyze operation of network 104.

In some embodiments, honeypots can send honeypot log information 130 to a honeypot log information database 132. In some embodiments, when unusual behavior is observed on network 104, information in honeypot log information database 132 can be retrieved to determine whether there is any corresponding honeypot activity. In some embodiments, the honeypot logs can be accessed with or without the intervention of a user. However, in some embodiments, access to honeypot log information can be restricted to one or more users or systems that are considered more trustworthy and/or more difficult to compromise. For example, an account designated as the owner of resources in network 104 can be prohibited from accessing information from honeypot log information database 132, as that account may be relatively more likely to be compromised during a breach of network 104. In such an example, access to honeypot log information 132 can be restricted to a parent account of the resource owner account, which may have more stringent security requirements than the resource owner account. For example, the parent account may require two-factor authentication (or a higher ordered multi-factor authentication) at each login, may log out the user after a period of inactivity, etc. This can reduce the likelihood that an attacker can gain access to honeypot log information, which may allow the attacker to easily identify (and bypass) honeypots in network 104.

In some embodiments, in connection with determining configuring information of honeypots to be deployed, honeypot configuration system 120 (and/or any other suitable system) can generate content that can be attached to one or more of the deployed honeypots. In some embodiments, content can be generated based on information about the user's content (e.g., determined based on an analysis of the user's content by network scanning system 112), and preconfigured template content stored in a repository of content 134. In some embodiments, honeypot configuration system 120 can retrieve information content repository 134 using profile information 116. In such an example, content repository 134 can include information about different types of content templates (e.g., documents, tables, spreadsheets, etc.) that can be used to provide decoy content that can be attached to one or more honeypots. In such an example, honeypot configuration system 120 can use properties of the user's content from profile information database 118 to select content to be attached to honeypots deployed in connection with network 104. In a more particular example, if network 104 includes a virtual machine instance that uses a particular operating system, such as Linux, and that access content from a filesystem stored in an electronic data store attached to network 104, honeypot configuration system 120 can query content repository 134 for content templates that have the same format of filing system configured to be attached to a virtual machine instance using the Linux operating system.

In some embodiments, content repository 134 can include content templates for certain types of documents (e.g., tables of user account data, corporate reporting documents, memos, emails, etc.) that can be filled in using information generated based on the types of information stored in connection with the user's virtual network.

In some embodiments, honeypot deployment system 126 can store information identifying honeypots that have been deployed to network 104, information identifying the user associated with network 104, and/or which content was attached to each of the deployed honeypots, to a deployed honeypot information database 136. For example, in connection with honeypot deployment system 126 causing one or more honeypots to be deployed to network 104, honeypot deployment system 126 can store identifying information about each honeypot in deployed honeypot database 136, such as a reference number (or other reference string), an IP address(es) assigned to the honeypot, identifying information about which template was used to generate the honeypot (e.g., from honeypot repository 122), etc. As another example, in connection with honeypot deployment system 126 causing content (e.g., stored in an electronic data store, stored in connection with a database service, etc.) attached to one or more honeypots deployed in network 104, honeypot deployment system 126 can identify the content that was attached to each honeypot (e.g., by storing a signature of the content or other information that can be used to uniquely identify the content, identifying information of a content template used to create the content, a location at which the content was stored, etc.).

In some embodiments, one or more systems can monitor honeypot log information 132 to determine which honeypots have been potentially compromised. For example, if honeypot log information 132 indicates that a particular electronic data store was accessed, deployed honeypot information database 136 can be accessed to determine which honeypot deployed in network 104 was attached to that electronic data store. As another example, if honeypot log information 132 indicates that a honeypot with a particular IP address was accessed and used to exfiltrate a file, deployed honeypot information database 136 can be accessed to determine which honeypot deployed in network 104 was accessed and/or where the file was stored. In some embodiments, the user of network 104 can be alerted to activity taking place on honeypots deployed in network 104. For example, the user can be sent a message (e.g., an email, a text message, a push notification, etc.). As another example, an alert can be associated with the user's account, such that when the user logs in to an account associated with managing network 104, the alert can be presented to the user.

In some embodiments, one or more systems can monitor activity associated with information that can be accessed via the honeypots deployed in network 104. For example, if content deployed in connection with the honeypot includes credentials for ostensibly accessing an account associated with the provider of the compute services, a system for authenticating access to the compute services can be instructed to monitor any log in attempts using the credentials. When the system for authenticating access determines that such a log in attempt has occurred (whether it granted access to anything or not, such as an account set up as another honeypot), the user can be alerted that a particular honeypot was compromised based on information in deployed honeypot information database 136 indicating which honeypot(s) had access to the credentials that were used. As another example, in some embodiments, one or more monitoring systems can search for content that was deployed in connection with the honeypots in locations where the information may be sold by malicious users. If the monitoring system finds content that was deployed with the honeypots, the monitoring system can determine that a particular honeypot was compromised based on information in deployed honeypot information database 136 indicating which honeypot(s) had access to the content.

Figure 2:
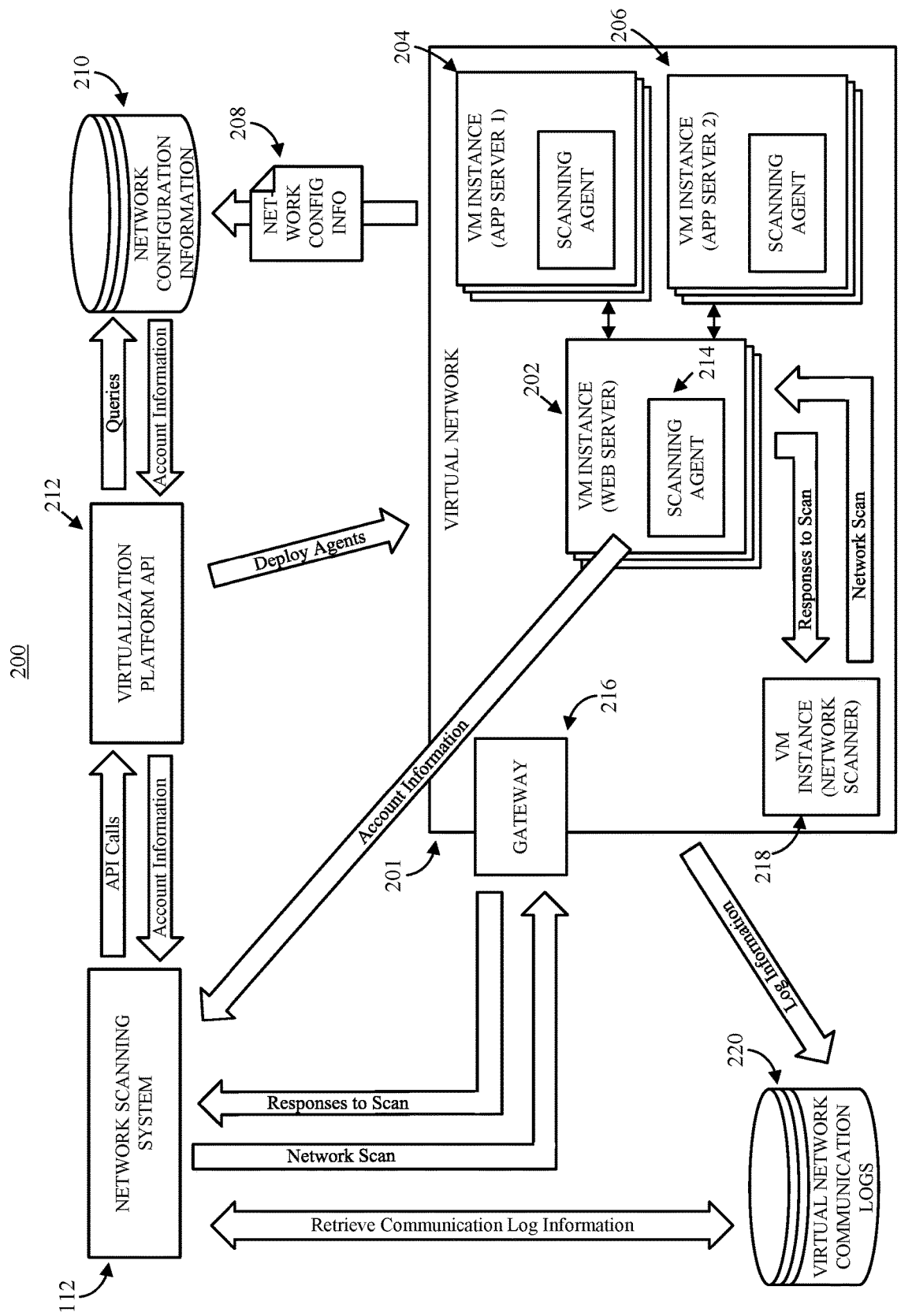
FIG. 2 is a diagram of an example of a system illustrating various techniques that can be used to gather account metadata about a configuration of a user's virtual network in accordance with some embodiments of the disclosed subject matter.

FIG. 2 shows an example of a system 200 illustrating various techniques that can be used to gather account metadata about a configuration of a user's virtual network in accordance with some embodiments of the disclosed subject matter. As shown in FIG. 2, a virtual network 201 (e.g., provided as part of network 104) can include various virtual machine instances 202-206 that can be used to implement various different functions, such as router, web server, load balancer, database, storage node, file system, business logic server, and/or any other suitable function(s). For example, VM instances 202 can be virtual machine instances that are implemented to provide a web server that can interact with client devices over a network (e.g., a public network such as the Internet and/or a private network such as a corporate intranet). As another example, VM instances 204 and 206 can be virtual machine instances that are implemented to provide applications accessible by the client devices through the web servers provided by VM instances 202. In some embodiments, as described above in connection with FIG. 1, network scanning system 112 can gather information about the configuration of at least a portion of virtual network 201 represented in FIG. 2. In some embodiments, virtual network 201 and/or a service providing resources included in virtual network 201 (e.g., a compute resources virtualization platform providing VM instances 202-206) can periodically (at regular and/or irregular intervals) report information about the state of instances, network interfaces, services, etc., within virtual network 201 by sending network configuration information 208 to a network configuration information database 210.

In some embodiments, network scanning system 112 can submit API calls to an API 212 provided by a compute resources virtualization platform to request information about the configuration of virtual network 201. For example, network scanning system can submit an API call requesting a list of all of the VM instances in a portion of virtual network 201 (e.g., a particular availability zone), and metadata related to the VM instances such as identifying information of the instance, identifying information of a virtual machine image used to launch the instance, identifying information of any network interfaces associated with the instance, one or more sets of security rules associated with the instance (e.g., identified with a semantically meaningful name and/or a string of characters), one or more sets of security rules associated with each network interface (e.g., identified with a semantically meaningful name or string of characters), a current state of the instance (e.g., running, pending, shutting down, etc.), identifying information of a type that describes certain properties of the instance, etc.

In some embodiments, API 212 can interact with network configuration information database 210 to retrieve the information requested by an API call from network scanning system 112 (if the information exists, and if network scanning system 112 is permitted to request such information). API 212 can return account information (e.g., account metadata 114) that is responsive to the API call to network scanning 112.

In some embodiments, network scanning system 112 can install (and/or request that the user install) scanning agents 214 on instances within virtual network 201. In some embodiments, scanning agents 214 can gather information about the instance on which it is installed, such as its IP address, which other devices it communicates with, information about which application(s) are being executed by the virtual machine instance, etc. In some embodiments, scanning agents 214 can report information about the instances in virtual network 201 to network scanning system 112. In some embodiments, scanning agents 214 can be installed using any suitable technique or combination of techniques. For example, network scanning system or a user associated with virtual network 201 can submit an API call that causes the compute resource virtualization platform to install the scanning agent on each VM instance specified by the API call. Note that, in some embodiments, VM instances that are implemented on different platforms (e.g., different operating systems) may require configuration of different versions of scanning agents 214. In some embodiments, scanning agent 214 can be installed on a single virtual machine instance of a group of virtual machine instance that perform the same function(s). For example, as shown in FIG. 2, a single scanning agent 214 can be installed on VM instance 202, and other VM instances 202 in the cluster may not have scanning agent 214 installed.

In some embodiments, network scanning system 112 can scan virtual network 201 through a network gateway 216 that provides access to the portion of virtual network 201 shown in FIG. 2. In some embodiments, network scanning system 112 can use any suitable technique or combination of techniques to scan the user's virtual network 201. For example, network scanning system 112 can query virtual network 201 through gateway 216 using one or more discovery protocols to discover computing device and/or network services on the portion of virtual network 201 accessible through gateway 216. In a more particular example, network scanning system 112 can perform a reverse Domain Name System ("DNS") lookup for one or more domain names associated with virtual network 201 (e.g., as submitted by a user of computing resources 102). In another more particular example, network scanning system 112 can perform a ping sweep (e.g., by sending Internet Control Message Protocol ("ICMP") echo requests, ICMP timestamp requests, ICMP address mask requests) across a range of IP addresses corresponding to virtual network 201 (e.g., IP addresses in a range defined by one or more subnets within virtual network 201). As another example, upon identifying devices in virtual network 201, network scanning system 112 can perform a port scan in connection with each device. As yet another example, network scanning system 112 can communicate with each device found on the network to determine the operating system and other characteristics of the device. In some embodiments, network scanning system 112 can use any suitable software for scanning virtual network 201, such as Network Mapper ("Nmap") software available from nmap (dot) org.

In some embodiments, network scanning system 112 and/or a user associated with virtual network 201 can deploy one or more virtual machine instances 218 into virtual network 201 to perform a network scan from within virtual network 201. In some embodiments, virtual machine instance 218 can use any suitable technique or combination of techniques to scan the user's virtual network 201, such as techniques described above in connection with network scanning system 112. Additionally or alternatively, in some embodiments, virtual machine instance 218 can use one or more additional techniques that can be performed by a host inside virtual network 201. For example, network scanning system 112 can perform an address resolution protocol ("ARP") sweep, to discover other hosts on a local network. In some embodiments, virtual machine instance 218 can be launched in connection with any suitable software and/or network interfaces to facilitate scanning of at least a portion of virtual network 201. For example, as described above, virtual machine instance can be launched in connection with Nmap software that can be executed by virtual machine instance to perform one or more network scans of virtual network 201.

In some embodiments, each VM instance can be associated with a corresponding virtualization system, which can implement communication managers configured to process incoming and outgoing data communications for the VM instances. For example, each virtualization system can implement data logging functionality configured to analyze incoming and outgoing data communications and generate log entries describing attributes of those data communications. In a more particular example, log entries can include the sources and destinations of data communications, source and destination ports for the data communication, an identification of a virtual network interface of the virtualization system on which the data communication was received and/or transmitted, a size of the data communication, a time that the data communication was received and/or transmitted, an identification of a product instantiated into the virtual machine to which the data communication was transmitted or from which the data communication was received, and/or any other suitable information. In some embodiments, such log entries (or any information from the log entries) can be transmitted to a logging service that includes a database 220 that stores virtual network communication logs. In some embodiments, network scanning system 112 can retrieve log information from database 220, and, based on the communications, can identify VM instances in virtual network 201, at least a portion of the network configuration of the instances, information about which applications are installed on the VM instances, the function of the various instances (e.g., based on the ports to which communications are being submitted), etc.

In some embodiments, network scanning system 112 can use one or more of the techniques described above in connection with FIG. 2 to gather account metadata, and build a profile of at least a portion of virtual network 201. Note that although network scanning system 112 is described as gathering information about virtual network 201 in connection with FIG. 2, network scanning system 112 can scan one or more non-virtual portions of network 104 that are physically controlled by the user (e.g., by the user directly or through a provider of physical compute resources). Further, in some embodiments, honeypots can be launched on such physical devices (e.g., outside of virtual network 201 but within network 104).

Figure 3:
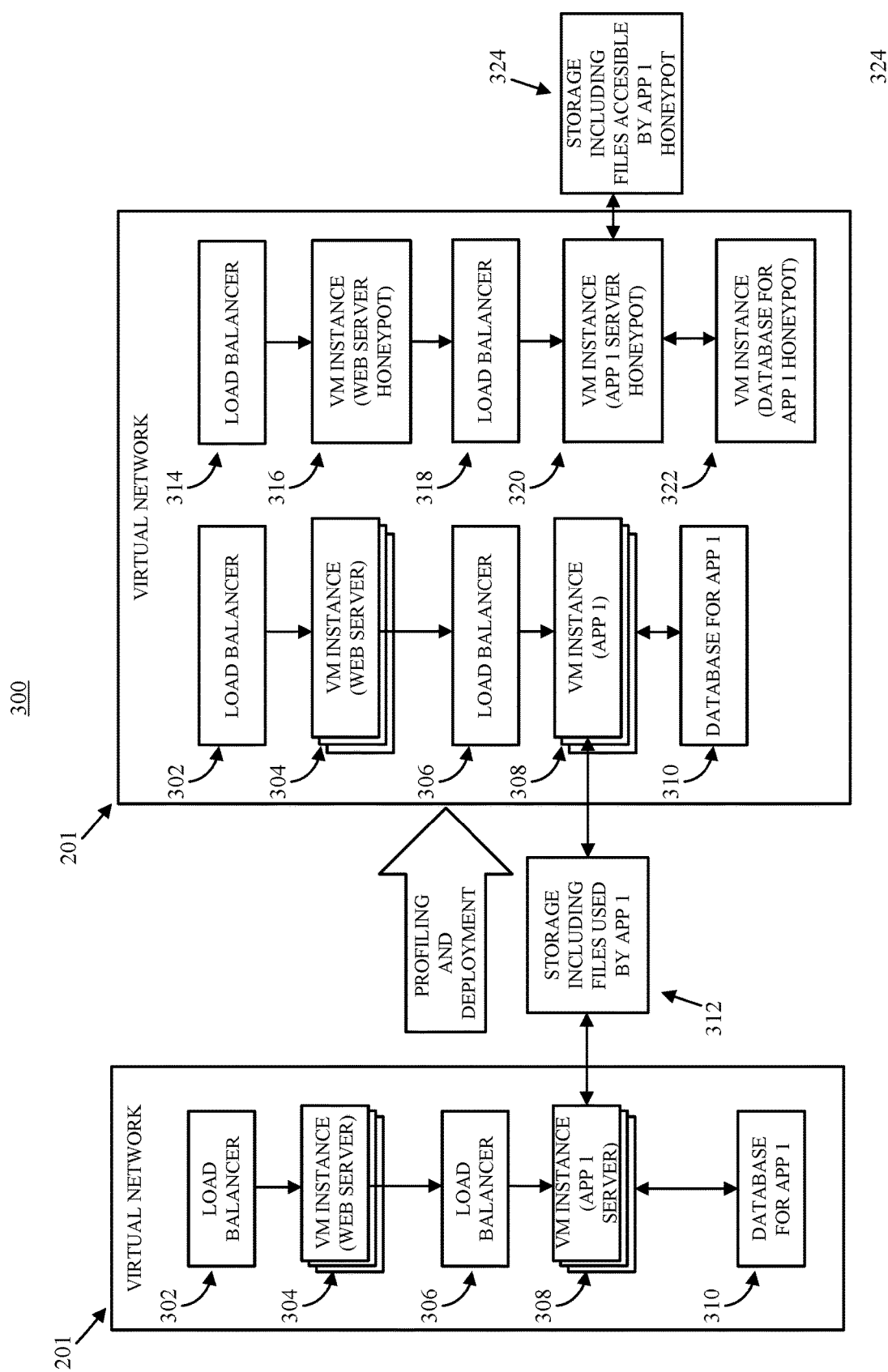
FIG. 3 is a diagram of an example of a portion a virtual network before and after profiling of the network and deployment of honeypots into the network with a similar network configuration in accordance with some embodiments of the disclosed subject matter.

FIG. 3 shows an example 300 of a portion a virtual network before and after profiling of the network and deployment of honeypots into the network with a similar network configuration in accordance with some embodiments of the disclosed subject matter. As shown in FIG. 3, virtual network 201 can include various devices and/or services that can be used to provide access to an application, a database, and/or files. For example, virtual network 201 can include a load balancer that distributes traffic to a cluster 304 of VM instances configured as web servers, which can access, via a second load balancer 306, a cluster 308 of VM instances configured as application services for providing access, through web servers 304 to an application (e.g., application 1). Additionally, in some embodiments, application servers 308 can access information from a database 310 and/or can access files stored a file system in an electronic data store 312 attached to application servers 308. In some embodiments, portions of virtual network 201 can be provided as a service. For example, load balancers 302 and/or 306, and database 310 can be provided as part of services, which may be made available by the same service provider that provides compute resources 102. As shown in FIG. 3, virtual network 201 after deployment of one or more honeypots can include a load balancer 314, a VM instance 316 configured as a web server honeypot with similar properties to the web server implemented by VM instances in cluster 304, a second load balancer 318, a VM instance 320 configured as an application server honeypot with similar properties to the application server implemented by VM instances in cluster 308, a VM instance 322 configured as a database server honeypot with similar properties to the database 310 provided in connection with cluster 308, and an electronic data store 324 attached to VM instance 320 storing decoy files that can be accessed through VM instance 320. In some embodiments, load balancers 314 and/or 318 can be provided by virtual machine instances configured as honeypots that operate as load balancers (and/or give the appearance of being a load balancer). Alternatively, load balancers 314 and/or 318 can be provided as a service (e.g., the same load balancing service used to implement load balancers 302 and/or 308). Additionally or alternatively, in some embodiments, database honeypot 322 can be provided by a database service (e.g., the database service used to provide access to database 310) configured with decoy content (which may be formatted based on, and/or include content generated based on, content accessible through database 310). In some embodiments, one or more VM instances can be networked together with VM instances in the user's virtual network. For example, VM instance 320 can be networked together with VM instances 304 (and/or a load balancer) to provide the appearance of an application server that can be accessed from VM instances 304, but is, in fact, a honeypot.

Figure 4A:
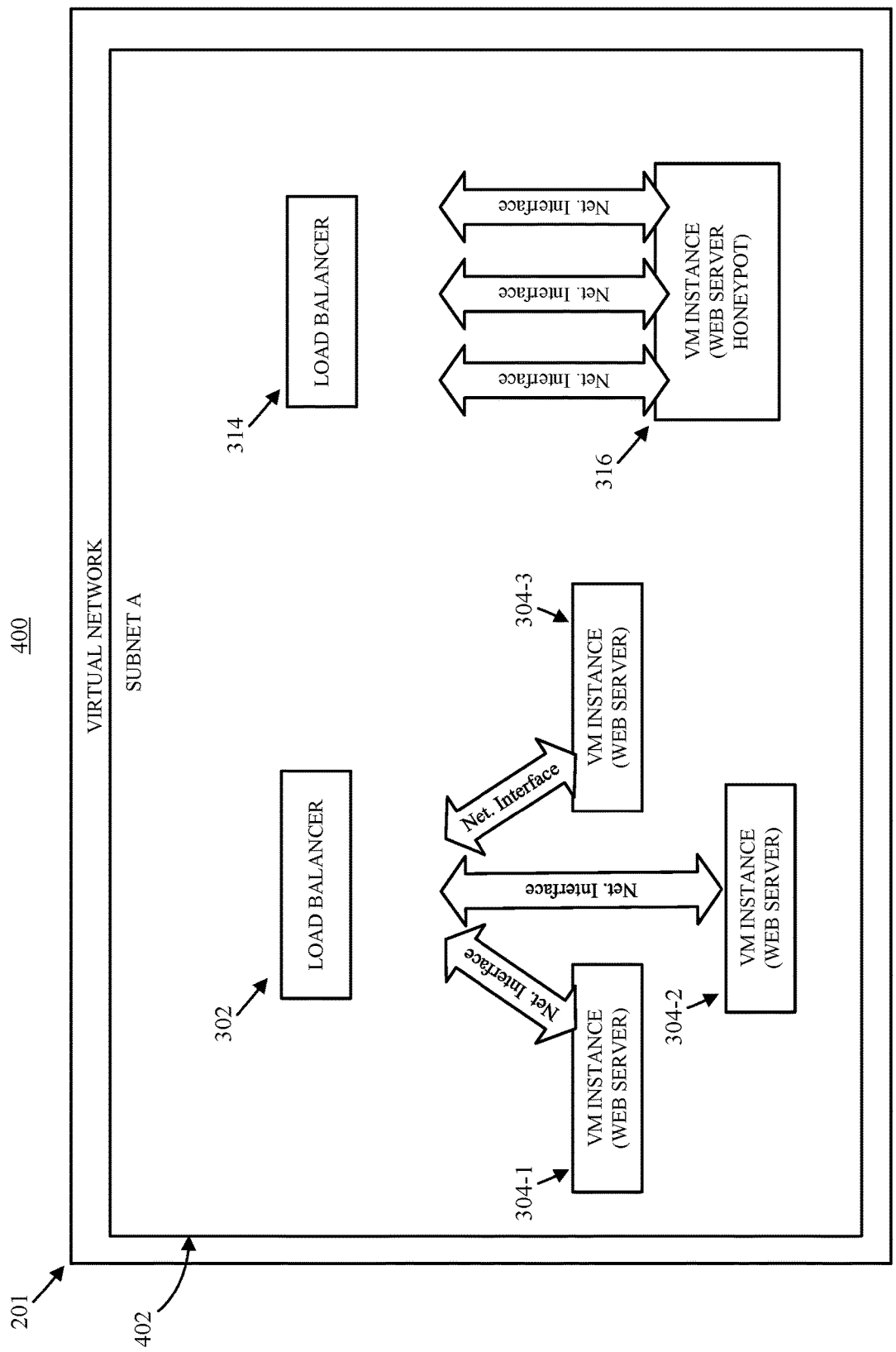
FIGS. 4A and 4B are diagrams of examples implementations of a portion of the network configuration from FIG. 3 in accordance with some embodiments of the disclosed subject matter.

FIG. 4A shows an example 400 of a subnet within virtual network 201 and an implementation of a portion of the network configuration from FIG. 3 in accordance with some embodiments of the disclosed subject matter. As shown in FIG. 4A, load balancer 302 can be communicate with various different web servers (304-1, 304-2, and 304-3) within web server cluster 304 using a separate network interface attached to each VM instance implementing a web server. As shown in FIG. 4A, load balancer 314 can communicate with a single web server honeypot 316 over three different network interfaces to give the appearance to an attacker (e.g., an attacker scanning subnet A) that web server honeypot 316 is three different devices. In some embodiments, when VM instance 320 is configured with multiple network interfaces, VM instance can execute multiple applications that can each interact with other devices (e.g., by sending and/or receiving communications) using a particular network interface. Additionally or alternatively, a single application can interact with other devices using the various network interfaces, and can present different information (e.g., metadata) in connection with each particular network interface.

Figure 4B:
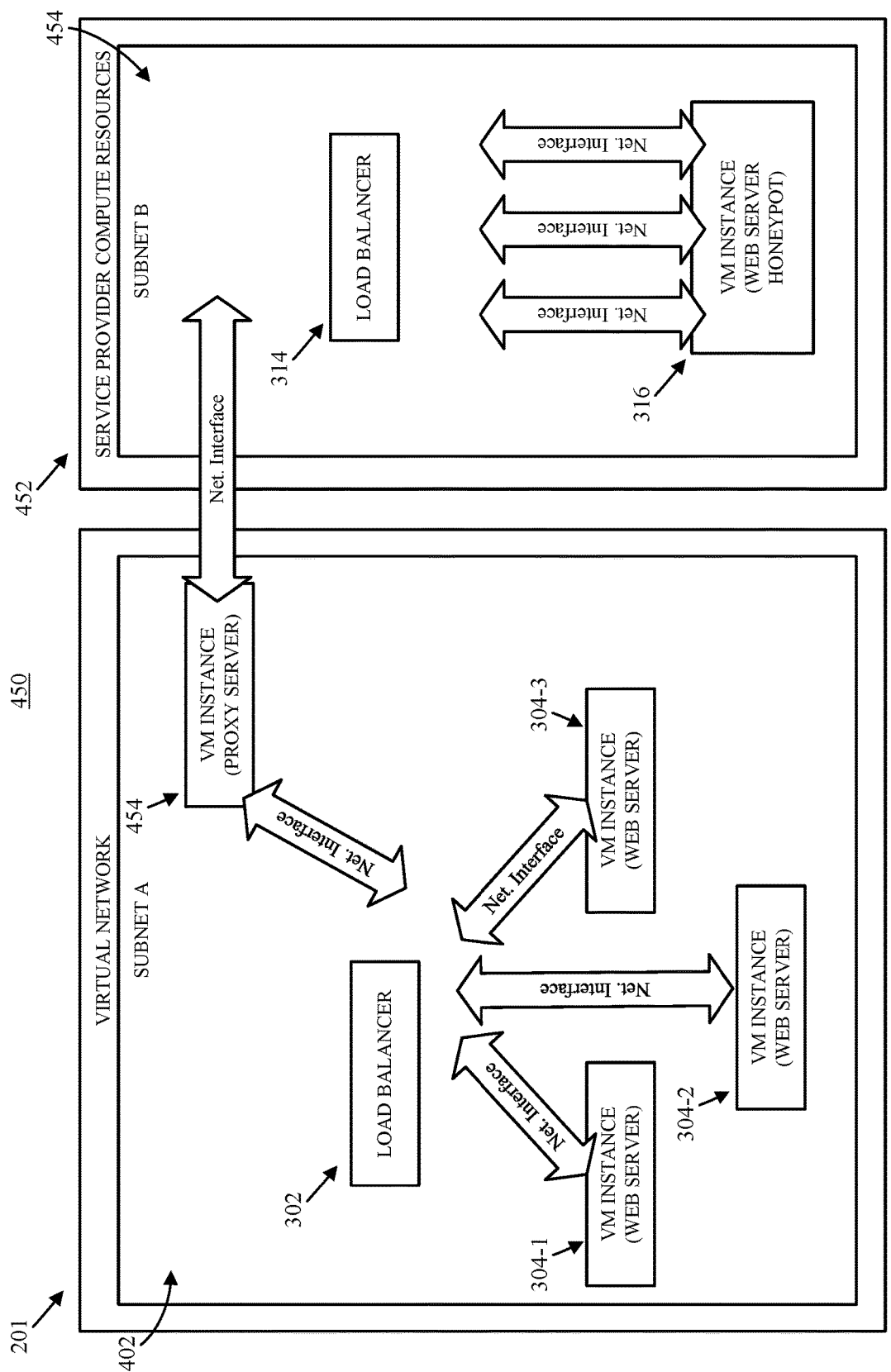

FIG. 4B shows an example 450 of a subnet within virtual network 201 and an implementation of a portion of the network configuration from FIG. 3 with honeypots implemented in a subnet within compute resources associated with the service provider of the honeypot configuration service in accordance with some embodiments of the disclosed subject matter. Similarly to example 400 described above in connection with FIG. 4A, load balancer 302 can be communicate with various different web servers (304-1, 304-2, and 304-3) within web server cluster 304 using a separate network interface attached to each VM instance implementing a web server. As shown in FIG. 4B, load balancer 314 and web server honeypot 316 can be implemented within compute resources 452 associated with the service provider of the honeypot configuration service. Load balancer 314 can communicate with web server honeypot 316 over three network interfaces within subnet B 454 to give the appearance to an attacker (e.g., an attacker scanning subnet A) that web server honeypot 316 is three different devices. However, the honeypot configuration service (or a user associated with virtual network 201) can deploy a VM instance 454 within virtual network 201 to act as proxy for load balancer 314 and/or web server honeypot 316. In some embodiments, proxy server 454 can have one network interface attached to subnet A 402 and a second network interface attached to subnet B 454.

Figure 5:
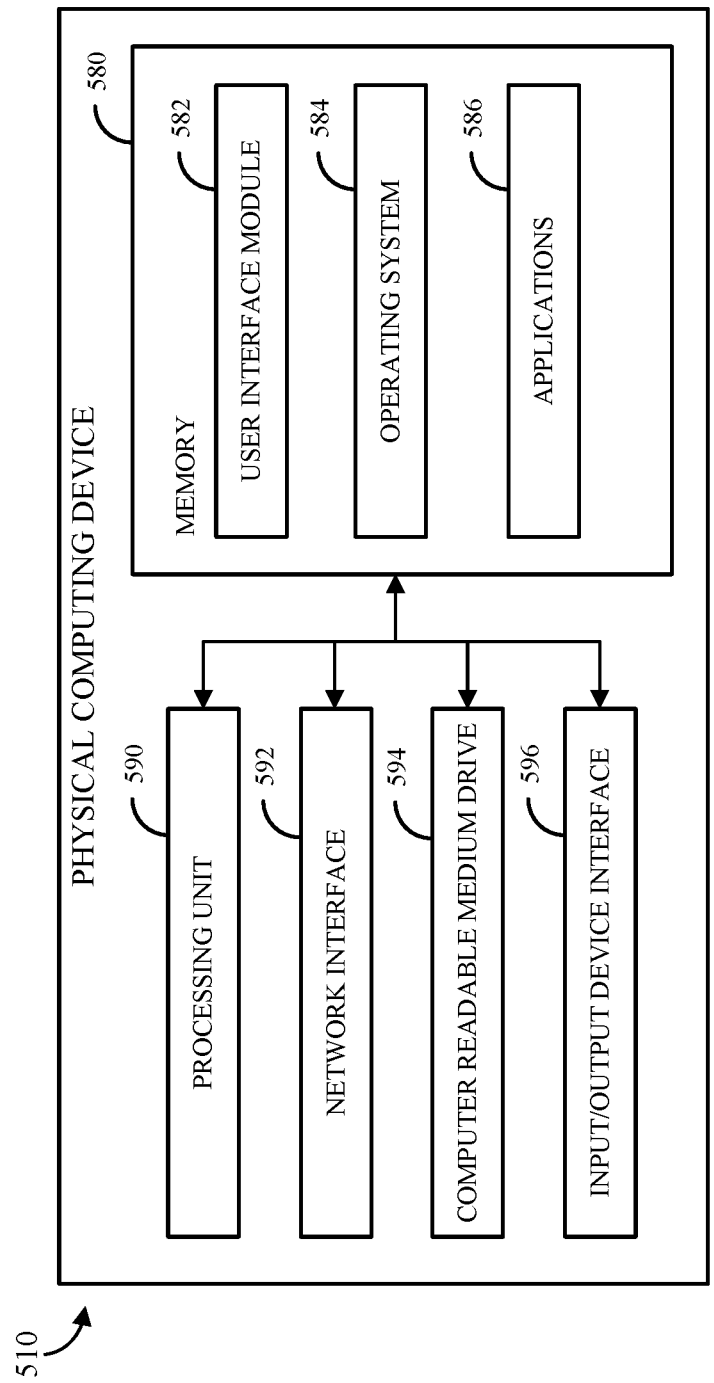
FIG. 5 is a diagram of an example of a general architecture of a physical computing device that can be used to provide access to at least a portion of the mechanisms described herein to configure and/or deploy customized honeypots in connection with a user's compute resources in accordance with some embodiments of the disclosed subject matter.

FIG. 5 shows an example of a general architecture of a physical computing device (e.g., a server) that can be used to provide access to at least a portion of the mechanisms described herein (e.g., as a portion of compute resources 102, as a portion of frontend 110, as a portion of network scanning system 112, as a portion of honeypot configuration system 120, as a portion of honeypot deployment system 126, etc.) to configure and/or deploy customized honeypots in connection with a user's compute resources in accordance with some embodiments of the disclosed subject matter. The general architecture of physical computing device 510 depicted in FIG. 5 includes an arrangement of computer hardware and/or software modules that can be used to implement aspects of the disclosed subject matter. The hardware modules can be implemented with physical electronic devices, as described below, and physical computing device 510 can include many more (or fewer) elements than those shown in FIG. 5. It is not necessary, however, that all of these generally conventional elements be shown in order to provide an enabling disclosure. Additionally, the general architecture illustrated in FIG. 5 may be used to implement one or more of the other components illustrated in FIG. 1. As illustrated, physical computing device 510 includes a processing unit 590, a network interface 592, a computer readable medium drive 594, and an input/output device interface 596, all of which can communicate with one another by way of a communication bus. Network interface 592 can provide connectivity to one or more networks or computing systems. Processing unit 590 can thus receive information and instructions from other computing systems or services via communication network 108. Processing unit 590 can also communicate to and from memory 580 and further provide output information for an optional display (not shown) via the input/output device interface 596. The input/output device interface 596 can also accept input from one or more optional input device (not shown).

Memory 580 can contain computer program instructions (e.g., grouped as modules in some embodiments) that processing unit 590 executes in order to implement one or more aspects of the disclosed subject matter. In some embodiments, memory 580 can include RAM, ROM, EEPROM, one or more flash drives, one or more hard disks, one or more solid state drives, one or more optical drives, etc., any other suitable persistent, auxiliary, or non-transitory computer-readable media, or any suitable combination thereof. Memory 580 can store an operating system 584 that provides computer program instructions for use by processing unit 590 in the general administration and operation of the disclosed subject matter. Memory 580 can further include computer program instructions and other information for implementing aspects of the disclosed subject matter. For example, in some embodiments, memory 580 can include a user interface module 582 that generates user interfaces (and/or instructions therefor) for display upon a computing device, e.g., via a navigation and/or browsing interface such as a browser or application installed on the computing device. In addition, memory 580 can include and/or communicate with one or more data repositories (not shown), for example, to retrieve software images, virtual machine images, libraries, virtual network profile information, honeypot configuration information, etc.

In some embodiments, memory 580 can include one or more applications 586 that may be executed by processing unit 590 to provide, for example, one or more of a virtualization system, a virtual machine instance, an API made available by frontend 110, a network mapping application, a network scanning application (e.g., to implement at least a portion of network scanning system 112), a honeypot configuration application (e.g., to implement at least a portion of network configuration system 120), a honeypot deployment application (e.g., to implement at least a portion of network deployment system 120), etc. For example, in some embodiments, physical computing device 510 can execute a virtual machine instance that can implement a web server in virtual network 201, a honeypot in virtual network 201, etc. In a more particular example, applications 586 can include one or more software images and/or virtual machine images that can be used to launch one or more virtual machines and/or software applications that can be executed by processing unit 590 to implement one or more portions of the disclosed subject matter.

Figure 6:
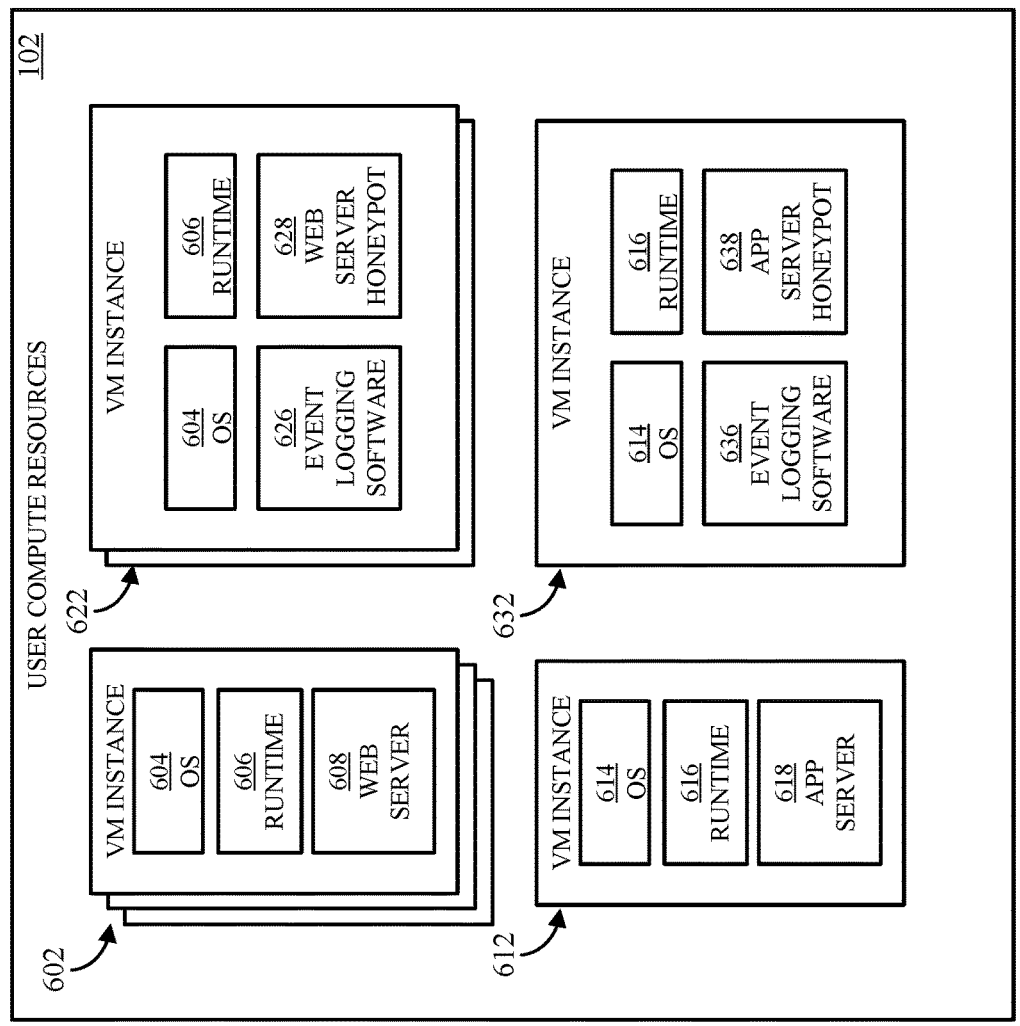
FIG. 6 is a diagram of an example of a portion of user compute resources that can be used to implement one or more portions of the system shown in FIG. 1 in accordance with some embodiments of the disclosed subject matter.

FIG. 6 shows an example of a portion of user compute resources 600 that can be used to implement one or more portions of system 100 shown in FIG. 1 in accordance with some embodiments of the disclosed subject matter. In some embodiments, virtual machine instances deployed in user compute resources 102 can be provided through a compute resource virtualization platform that provides access to virtual machines that can launch and execute a variety of applications from software images and/or virtual machine images. For example, in some embodiments, user compute resources 102 can include any suitable number of virtual machines, such as virtual machine instances 602, 612, 622, and 632. In some embodiments, a "virtual machine instance" can refer to a specific allocation of virtual computing resources that has the properties of a particular virtual machine. In some embodiments, virtual machine instances 602, can run software to provide functionality of a web server. In some embodiments, virtual machine instances 602 can be launched using a virtual machine image that includes the entire state of a virtual machine instance that was configured to act as a web server at the time it was imaged, such that a virtual machine instance and any software applications installed on the virtual machine instance can be restored to that point by restoring/launching the virtual machine image to implement a new virtual machine instance that can act as a web server.

As shown in FIG. 6, VM instances 602 can each have an OS 604, a language runtime 606, and software 608 for providing web server functionality, and a VM instance 612 can have a different OS 614, a language runtime 616, and software 618 for providing application server functionality. In some embodiments, a user associated with compute resources 102 can deploy VM instances 602 and/or 612 to provide a web page using a web server implemented by a cluster of VM instances 602 that can provide access to an application server implemented using VM instance 612. In some embodiments, VM instances 602 and 612 can be part of the user's production computing environment. As shown in FIG. 6, user compute resources 102 can be used to deploy a cluster of virtual machine instances 602 that can, for example, replicate the functionality of the web server implemented using web server software 608, to which incoming traffic can be distributed using a load balancer. In some embodiments, based on the configuration of the user compute resources 102, network scanning system 112 can generate profile information that can be used by honeypot configuration system 120 and honeypot deployment system 126 to deploy honeypots into user compute resources 102 that are configured in a network that is similar to the configuration of the user's production computing environment. For example, honeypot configuration system 120 can determine that a cluster of honeypots 622 using OS 604 and runtime 606 are to be deployed with event logging software 626 for collecting and sending information about the activities of honeypots 622, and a web server honeypot application 628 that is configured to replicate at least a portion of the functions provided by web server software 608. In some embodiments, web server honeypot application 628 can be implemented using any suitable technique or combination of techniques, such as by using executing an HTTP daemon. In some embodiments, honeypot application 628 (and/or any other suitable application executed by a honeypot, such as event logging software 626, honeypot application 638, etc.) can implement one or more countermeasures that are designed to identify, counteract, and/or obstruct unauthorized access to the resources of the user associated with compute resources 102. For example, honeypot application 628 can provide an additional target that draws resources from the user's resources. As another example, honeypot application 628 can facilitate detection of unauthorized access, as any access to resources associated with honeypot application 628 and/or honeypot 622 can be presumed to be unauthorized. Accordingly, activity recorded in connection with honeypot 622 can be used to determine that unauthorized access to at least a portion of compute resources 102 has occurred. As yet another example, honeypot application 628 can be designed to be a more attractive target than the user's resources (e.g., by being less secure), which can reduce the effort expended on gaining unauthorized access to the user's resources.

As another example, honeypot configuration system 120 can determine that another honeypot 632 using OS 614 and runtime 616 is to be deployed with event logging software 636 for collecting and sending information about the activities of honeypots 632, and an application server honeypot application 638 that is configured to replicate at least a portion of the functions provided by application server software 618.

In some embodiments, honeypot deployment system 126 can deploy honeypots 622 as virtual machine instances using one or more virtual machine images and/or software images that include event logging software 626 and/or web server honeypot application 628. In some embodiments, event logging software 626 can record information about the operation of web server honeypot application 628 and/or operation of the virtual machine instance implementing honeypot 622, such as: HTTP requests, whether any additional applications have been installed on the virtual machine instance (e.g., malware installed by a potential attacker); whether any files have been added to a file system attached to honeypot 622 (e.g., for use by web server honeypot application 628); whether any files have been deleted, copied, or otherwise exfiltrated from a file system attached to honeypot 622; login attempts; users active on honeypot 622; information about the performance of honeypot 622; whether any settings have been changed in web server honeypot application 628 and/or honeypot 622; commands executed on honeypot 622, such as a command for enumerating users of honeypot 622; network activity, such as whether scanning for systems to which honeypot is connected and/or has communicated with has occurred; etc.

In some embodiments, event logging software 626 can be deployed as part of honeypot 622 as shown in FIG. 6. For example, event logging software 626 can run as an application associated with web server honeypot application 628 and/or as part of web server honeypot application 628. Additionally or alternatively, in some embodiments, event logging software 626 can be deployed outside of honeypot 622. For example, honeypot 622 can be configured as a nested virtual machine instance or a collection of one or more container instances being executing by a virtual machine instance, and event logging software 626 can be executed by the parent virtual machine instance or one or more other containers being executed by the virtual machine instance executing honeypot 622 as a collection of containers, which can facilitate isolation of event logging software 626 and web server honeypot application 628, for example. As another example, in some embodiments, event logging software 626 can be executed outside of honeypot 622. In a more particular example, event logging software 626 can be implemented as part of a virtualization system of a physical computing device executing honeypot 622. In another more particular example, event logging software 626 can be executed by a virtual machine instance in user compute resources 102 that can access network traffic to and/or from honeypot 622 (e.g., such a virtual machine instance can be configured as any suitable computing device, such as a proxy server between honeypot 622 and the attacker, or a router serving honeypot 622). In such an example, event logging software 626 can be implemented as a packet sniffer, a network tap, or other system that records network traffic.

In some embodiments, event logging software 626 can use any suitable technique or combination of techniques to record activity by honeypot 622. For example, as described above, event logging software 626 can include software that records network traffic, such as a network tap or packet sniffer. As another example, event logging software 626 can take a snapshot of system files, files in a file system attached to honeypot 622, registry entries, and running processes of honeypot 622 periodically (at regular and/or irregular intervals), which can be used (e.g., by an administrator of user compute resources 102) to determine whether honeypot 622 has interacted with any potentially malicious users that may have also compromised other devices within user compute resources 102. As yet another example, event logging software 626 can log credentials submitted to web server honeypot application 628 and/or honeypot 622. As still another example, event logging software 626 can log activity by web server honeypot application 628, such as queries that are submitted, requests that are submitted, ports that are scanned, etc. In some embodiments, event logging software 636 can be implemented in a similar fashion to event logging software 626, but can record less and/or additional information, such as requests to run an application, requests for information about the application, information accessed by application server honeypot application 638, etc.

Figure 7:
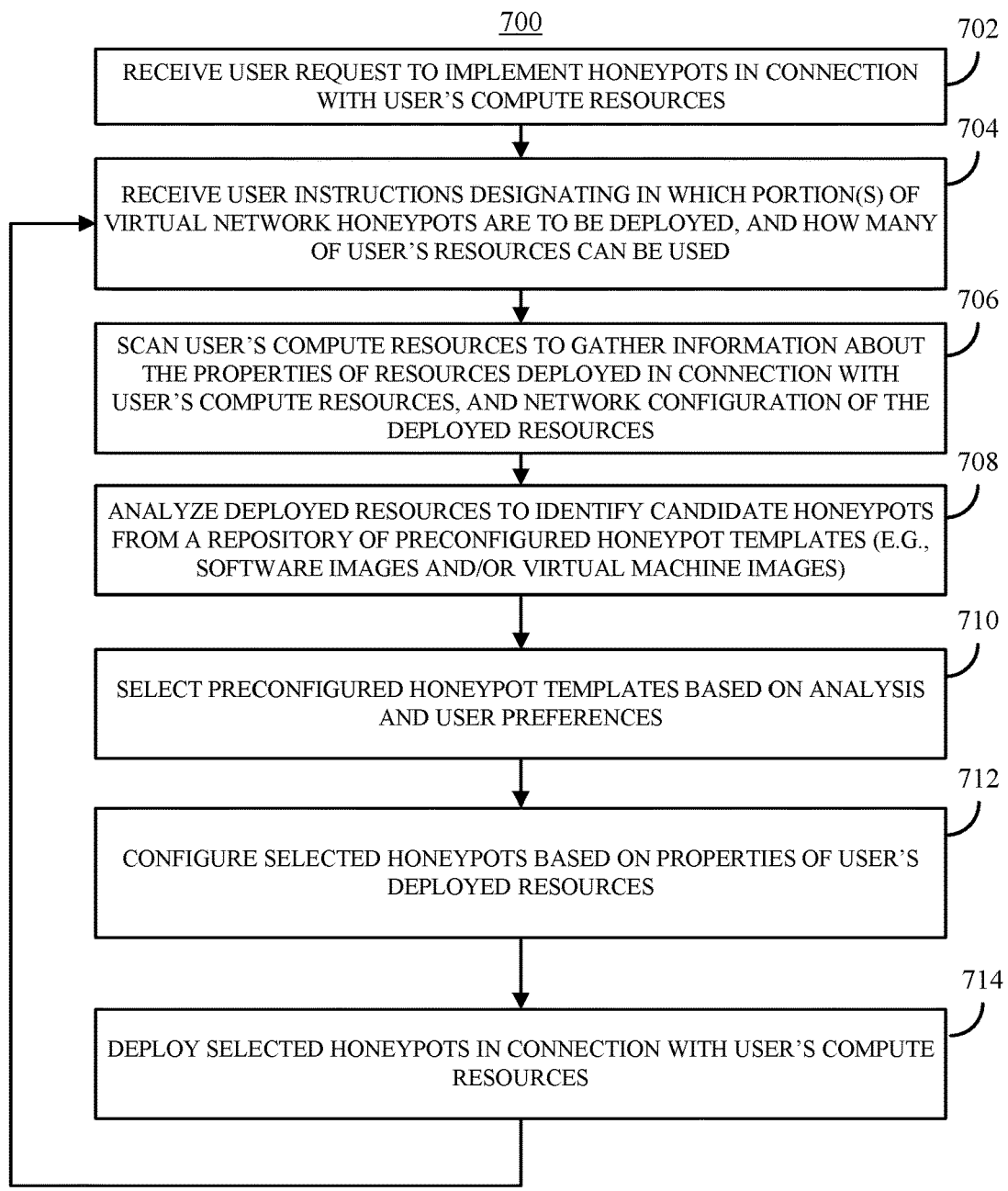
FIG. 7 is a diagram of an example process for configuring and deploying customized honeypots in virtual networks in accordance with some embodiments of the disclosed subject matter.

FIG. 7 shows an example 700 of a process for configuring and deploying customized honeypots in virtual networks in accordance with some embodiments of the disclosed subject matter. As shown in FIG. 7, at 702, process 700 can receive a user request to implement customized honeypots in at least a portion of the user's compute resources. For example, frontend 110 can receive a web service request identifying a user account and including a request to use the service for adaptively configuring and deploying honeypots. In some embodiments, the request can also include a request to deploy honeypots in connection with a particular portion or portions of the user's virtual network (e.g., regions, availability zones, subnets, etc.). Additionally, in some embodiments, the request can also include a request to deploy honeypots in the user's compute resources or in the service providers compute resources. In some embodiments, process 700 can determine whether a user and/or computing device associated with a request is authorized to submit such requests. For example, process 700 can determine whether the user and/or computing device has valid permissions to make such a request on behalf of the user associated with the compute resources. As another example, process 700 can determine whether the user associated with the compute resources is authorized to use the service for adaptively configuring and deploying honeypots (e.g., whether the user has subscribed to the service). In some embodiments, if a user is not authorized, process 700 can end and/or can indicate that the user and/or computing device making the request does not have authorization to submit the request (and can prompt the user to subscribe to the service).

At 704, process 700 can receive user instructions designating in which portions of the user's virtual network honeypots are to be deployed, and how many of the user's resources can be used to deploy the honeypots. For example, as described above, process 700 can receive instructions received identifying a particular virtual network, regions(s), availability zone(s), subnet(s), etc., in which the user wishes to place honeypots. As another example, process 700 can receive instructions identifying the maximum number of virtual machine instances that the service for adaptively configuring and deploying honeypots can deploy to the user's compute resources. As yet another example, process 700 can receive instructions indicating a budget (e.g., per day, per week, per month) for deploying honeypots to the user's resources.

In some embodiments, process 700 can receive instructions indicating a process by which network configuration information is to be gathered. For example, process 700 can cause a user interface to be presented that can receive user instructions selecting from among a variety of processes (e.g., as described above in connection with FIG. 2) that can be used to gather such network configuration information, as well as information about the various processes (e.g., whether there is a cost associated with the process, the length of time the process is likely to take, the accuracy of the network configuration that the particular process is likely to produce, etc.).

In some embodiments, process 700 can provide additional information based on the one or more processes that are selected. For example, process 700 can provide instructions for installing an agent on VM instances that the user wishes to be scanned. As another example, process 700 can request permissions to interact with a API that can be used to gather information about the configuration of the user's virtual network.

Additionally, in some embodiments, process 700 can receive instructions indicating that process 700 can commence scanning the user's compute resources. In some embodiments, such instructions can be provided through a user interface (e.g., a web page), as an API call, as a reply to a message (e.g., a response to an email or text message), by visiting a particular web page (e.g., by navigating to a link presented in an email), etc.

At 706, process 700 can scan the user's compute resources to gather information about properties of resources (e.g., VM instances, services, etc.) deployed in connection with the user's compute resources, and network configuration information. In some embodiments, process 700 can use any suitable technique or combination of techniques to scan the user's compute resources, such as techniques described above in connection with FIG. 2. Note that, in some embodiments, in addition to, or in lieu of scanning the user's compute resources, process 700 can receive user input (e.g., through a graphical user interface) specifying information about the resources deployed in the user's compute resources and/or the network configuration of the deployed resources.

At 708, process 700 can analyze information gathered by scanning the user's compute resources at 706 to identify candidate honeypots from a repository of preconfigured honeypot templates. In some embodiments, process 700 can use any suitable technique or combination of techniques to identify candidate honeypots, such as techniques described above in connection with honeypot configuration system 120 of FIG. 1. For example, process 700 can filter the preconfigured honeypot templates based on the operating system of a user resource, the security rules applied to the user resource, the programming language of the user resource, the function of the user resource, etc.

At 710, process 700 can select one or more preconfigured honeypot templates to be deployed in connection with the user's resources (e.g., in the portion of the user's virtual network indicated at 704). In some embodiments, as described above in connection with FIG. 1, process 700 can select multiple preconfigured honeypot templates that may be relatively close matches (e.g., when there is not an exact match) for a particular resource, and can receive user input (e.g., via a graphical user interface, an API, etc.) indicating which preconfigured honeypot template to use. Additionally, in some embodiments, process 700 can receive user input to further configure the preconfigured honeypot templates based on user preferences and/or user input (e.g., indicating that a particular setting is to be changed).

At 712, process 700 can further configure the selected honeypots based on properties of the user's deployed resources such that the honeypots, when deployed will behave in a similar manner to the user's other deployed resources. In some embodiments, process 700 can configure one or more of the selected honeypots based on the capabilities of the selected honeypot and the properties of the user's deployed resources. For example, if the preconfigured honeypot represented by a selected template is capable of emulating two different types of web server, process 700 can configure the honeypot to emulate one of the two types based on a corresponding web server in the user's resources. As another example, if the preconfigured honeypot represented by a selected template is capable of appearing to use two (or more) different programming languages, process 700 can configure the honeypot to appear to use a particular programming language of the programming languages that the honeypot can be configured to use. In some embodiments, process 700 can configure the selected honeypots using any suitable technique or combination of techniques, such as by passing a parameter indicating, for example, which programming language to use when deployed.

Additionally or alternatively, in some embodiments, process 700 can receive information from compute resources 102 (and/or any other suitable computing device associated with the user) indicating which of multiple choices the user (and/or user's compute resources 102) has selected for implementation by a particular honeypot. For example, process 700 can prompt a user of compute resources 102 to select which programming language of multiple available programming languages is to be used by a particular honeypot. As another example, process 700 can submit a request (e.g., as an API call) to compute resources 102 requesting information indicating which type of web server to emulate with a particular honeypot. In such an example, process 700 can receive a response indicating a particular type of web server that the honeypot is to emulate.

At 714, process 700 can deploy the selected and configured honeypots in connection with the user's compute resources. In some embodiments, process 700 can use any suitable technique or combination of techniques to deploy honeypots in connection with the user's compute resources, such as techniques described above in connection with honeypot deployment system 126 of FIG. 1. For example, process 700 can submit API calls to an API made available by a service provider that provides user compute resources. In such an example, the API calls can include instructions to launch honeypots based on particular software images and/or virtual machine images. As another example, process 700 can provide instructions to the user associated with user compute resources to deploy the honeypots. In a more particular example, process 700 can provide a template that can be submitted by the user to deploy the honeypots selected at 710.

In some embodiments, process 700 can require explicit user permission prior to deploying honeypots to the user's resources. Additionally or alternatively, in some embodiments, process 700 can receive instructions to carry out certain changes without user intervention (e.g., without requiring user permission), and to refrain from making other changes. For example, process 700 can receive instructions to carry out changes to the number of instances of a particular honeypot configuration (or changes to the number of network interface attached to one honeypot) unless the instance would be entirely removed or the number of instances would exceed a user-defined threshold. As another example, process 700 can receive instructions to carry out changes that occur on a regular basis. In a more particular example, such a change can include increasing and decreasing the number of instances of a particular honeypot in accordance with predicable changes in traffic (e.g., when the number of instances of a particular virtual machine in the user's virtual network scales up or down based on traffic).

In some embodiments, process 700 can return to 704 to determine whether additional instructions designating further portions of the user's virtual network have been received, and/or to scan additional portions of the user's virtual network at 706. For example, in some embodiments, process 700 can scan portions of the user's virtual network that are physically isolated separately. Additionally or alternatively, in some embodiments, process 700 can re-scan portions of the user's virtual network that have already been scanned and/or portions that are associated with honeypots configured by process 700. In some embodiments, process 700 can re-scan portions of the user's virtual network that have already been scanned in response to a triggering event. For example, process 700 can (with explicit permission from the user) receive log information about changes to at least a portion of the user's virtual network, such as deployment of software applications to one or more virtual machine instances, changes to add and/or remove virtual machine instances from the virtual network (e.g., changes in the number of virtual machine instances in a cluster performing the same function, of changes other than scaling up or down the number of virtual machine instances in a cluster). As another example, process 700 can (with explicit permission from the user) receive log information about network activity on at least a portion of the user's virtual network, and can monitor the network activity for changes that may indicate a change to the underlying network structure. In a more particular example, process 700 can use anomaly detection techniques to determine whether a particular portion of network activity is "normal" or "abnormal" (e.g., different than an established pattern of network activity).

In accordance with some embodiments of the disclosed subject matter, a system is provided, the system comprising: an electronic data store configured to store preconfigured honeypot templates; and one or more hardware computing devices in communication with the electronic data store and configured to execute specific computer-executable instructions that upon execution cause the system to: receive a request to analyze a first portion of a virtual network associated with a user; determine that the first portion of the virtual network includes a first virtual machine instance having first properties; determine that the first portion of the virtual network includes a second virtual machine instance having second properties; determine that the first virtual machine instance and the second virtual machine instance are connected in a first network configuration; generate network configuration information that describes at least the first properties of the first virtual machine instance, the second properties of the second virtual machine instance, and the first network configuration; cause a first honeypot to be deployed in connection with the first portion of the virtual network using a first template from the electronic data store that has at least one first honeypot property that matches at least one of the first properties; cause a second honeypot to be deployed in connection with the first portion of the virtual network using a second template from the electronic data store that has at least one second honeypot property that matches at least one of the second properties; cause the first honeypot and the second honeypot to be connected in a second network configuration selected based at least in part on the first network configuration.

In some embodiments, the first properties include an operating system of the first virtual machine instance, and a function of the first virtual machine instance.

In some embodiments, the one or more hardware computing devices are further configured to execute specific computer-executable instructions that upon execution cause the system to: prompt the user to grant permission to the system to deploy at least one virtual machine instance in the virtual network; subsequent to being granted permission to deploy the at least one virtual machine instance, cause a compute service to launch the first honeypot in the virtual network by submitting a first virtual machine image corresponding to the first template to the compute service via an application program interface ("API") provided in connection with the compute service.

In some embodiments, the second network configuration connects the first honeypot and the second honeypot to the virtual network.

In accordance with some embodiments of the disclosed subject matter, a system is provided, the system comprising one or more hardware computing devices configured to execute specific computer-executable instructions that upon execution cause the one or more hardware computing devices to: identify a type of function of a virtual machine in a virtual network; select, based at least in part on the identified function of the virtual machine, a template for a honeypot instance configured based at least in part on the identified function; cause a honeypot to be deployed in connection with the virtual network using the template retrieved from an electronic data store having a plurality of different templates.

In some embodiments, execution of the specific computer-executable instructions further causes the one or more hardware computing devices to: submit an API call to an API made available by a compute service, the API call requesting information about the virtual network; and receive, from the API, information about the virtual machine.

In some embodiments, execution of the specific computer-executable instructions further causes the one or more hardware computing devices to: determine that the template matches one or more properties of the virtual machine, including at least an operating system, based on the information about the virtual machine received from the API.

In some embodiments, execution of the specific computer-executable instructions further causes the one or more hardware computing devices to: identify one or more properties of a first item of content that is accessible via the virtual network and stored using storage provided as a service; and cause a second item of content to be stored in connection with the honeypot using a content template retrieved from a second electronic data store having a plurality of different content templates, wherein the second item of content shares at least one property with the first item of content.

In some embodiments, execution of the specific computer-executable instructions further causes the one or more hardware computing devices to cause the honeypot to be associated with a plurality of IP addresses within the virtual network.

In some embodiments, execution of the specific computer-executable instructions further causes the one or more hardware computing devices to: identify, based on results of analyzing at least a portion of the virtual network, a second type of function of a second virtual machine in the virtual network; determine that the second virtual machine was not identified by a previous analysis of at least the portion of the virtual network; cause a second honeypot to be deployed in connection with the virtual network using a second template retrieved from the electronic data store.

In some embodiments, execution of the specific computer-executable instructions further causes the one or more hardware computing devices to: determine that the template and a second template from the plurality of different templates both match a plurality of properties of the virtual machine; prompt the user to select, from a group of templates including the template and the second template, a particular template to be used to deploy the honeypot; receive a selection of the template from a computing device associated with the user; responsive to the selection, cause the honeypot to be deployed.

In some embodiments, a method is provided, the method comprising: selecting, based at least in part on a profile associated with a user account, a virtual machine image having a type and associated with a countermeasure; and causing a virtual machine to be launched in connection with a virtual network associated with the user account.

In some embodiments, the method further comprises: analyzing at least a portion of the virtual network, wherein the profile is based at least in part on the analyzing; identifying at least one virtual machine instance of a first type in the virtual network based on the analyzing; and selecting the virtual machine image based on the type matching the first type.

In some embodiments, analyzing at least the portion of the virtual network comprises scanning the portion of the network In some embodiments, scanning the portion of the virtual network comprises causing a second virtual machine within the virtual network to send one or more messages to other virtual machine instances in the virtual network.

In some embodiments, the method further comprises causing the second virtual machine to be launched prior to scanning the virtual network.\

In some embodiments, the method further comprises: causing the virtual machine to be launched using compute resources that are not part of the virtual network; and causing the virtual machine to appear to be part of the virtual network by providing one or more network connections between the compute resources and the virtual network.

In some embodiments, the method further comprises: determining, based on the profile, that the virtual network is attached to first storage provided by a service provider; and causing second storage to be attached to the virtual machine.

In some embodiments, the method further comprises causing a plurality of content items to be stored in the second storage, wherein properties of the plurality of content items are based on properties of content items in the first storage.

In some embodiments, the method further comprises: selecting, based on the properties of content items in the first storage, template content items from a repository of template content; and generating the plurality of content items using the template content items and identifying information.

Although subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

It should be understood that the above described steps of the processes of FIG. 7 can be executed or performed in any order or sequence not limited to the order and sequence shown and described in the figures. Also, some of the above steps of the processes of FIG. 7 can be executed or performed substantially simultaneously where appropriate or in parallel to reduce latency and processing times.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A system, comprising:
an electronic data store configured to store preconfigured honeypot templates; and
one or more hardware computing devices in communication with the electronic data store and configured to execute specific computer-executable instructions that upon execution cause the system to:

receive a request to analyze a first portion of a virtual network associated with a user;

in response to the request to analyze the first portion of the virtual network, scan at least the first portion of the virtual network;

determine, based on the scan, that the first portion of the virtual network includes a first virtual machine instance having first properties;

determine, based on the scan, that the first portion of the virtual network includes a second virtual machine instance having second properties;

determine, based on the scan, that the first virtual machine instance and the second virtual machine instance are connected in a first network configuration;

generate network configuration information that describes at least the first properties of the first virtual machine instance, the second properties of the second virtual machine instance, and the first network configuration;

cause a first honeypot to be deployed within the first portion of the virtual network using a first template from the electronic data store that has at least one first honeypot property that matches at least one of the first properties;

cause a second honeypot to be deployed within the first portion of the virtual network using a second template from the electronic data store that has at least one second honeypot property that matches at least one of the second properties; and cause the first honeypot and the second honeypot to be connected within the first portion of the virtual network in a second network configuration selected based at least in part on the first network configuration such that the first honeypot and the second honeypot emulate at least a portion of the first network configuration.

2. The system of claim 1, wherein the first properties include an operating system of the first virtual machine instance, and a function of the first virtual machine instance.

3. The system of claim 1, wherein the one or more hardware computing devices are further configured to execute specific computer-executable instructions that upon execution cause the system to:

prompt the user to grant permission to the system to deploy at least one virtual machine instance in the virtual network; and subsequent to being granted permission to deploy the at least one virtual machine instance, cause a compute service to launch the first honeypot in the virtual network by submitting a first virtual machine image corresponding to the first template to the compute service via an application program interface ("API") provided in connection with the compute service.

4. The system of claim 1, wherein the second network configuration connects the first honeypot and the second honeypot to the virtual network.

5. A system, comprising one or more hardware computing devices configured to execute specific computer-executable instructions that upon execution cause the one or more hardware computing devices to:

identify a type of function of a first virtual machine provided in a virtual network via a compute service;

select, based at least in part on the identified type of function of the first virtual machine, a template for a honeypot instance configured based at least in part on the identified type of function;

cause the compute service to deploy a honeypot in the virtual network by using the template retrieved from an electronic data store having a plurality of different templates to configure a second virtual machine that is provided in the virtual network via the compute service;

identify a type of function of a third virtual machine provided in the virtual network via the compute service, wherein the first virtual machine and the third virtual machine are connected in a first network configuration;

cause the compute service to deploy a second honeypot in the virtual network by using a second template retrieved from the electronic data store to configure the third virtual machine that is provided in the virtual network via the compute service; and cause the first honeypot and the second honeypot to be connected within the virtual network in a second network configuration selected based at least in part on the first network configuration such that the first honeypot and the second honeypot emulate at least a portion of the first network configuration, wherein the second network configuration connects the first honeypot and the second honeypot to the virtual network.

6. The system of claim 5, wherein execution of the specific computer-executable instructions further causes the one or more hardware computing devices to:

submit an API call to an API made available by the compute service, the API call requesting information about the virtual network; and receive, from the API, information about the first virtual machine.

7. The system of claim 6, wherein execution of the specific computer-executable instructions further causes the one or more hardware computing devices to:

determine that the template matches one or more properties of the first virtual machine, including at least an operating system, based on the information about the first virtual machine received from the API.

8. The system of claim 5, wherein execution of the specific computer-executable instructions further causes the one or more hardware computing devices to:

identify one or more properties of a first item of content that is accessible via the virtual network and stored using storage provided as a service; and cause a second item of content to be stored in connection with the honeypot using a content template retrieved from a second electronic data store having a plurality of different content templates, wherein the second item of content shares at least one property with the first item of content.

9. The system of claim 5, wherein execution of the specific computer-executable instructions further causes the one or more hardware computing devices to cause the honeypot to be associated with a plurality of IP addresses within the virtual network.

10. The system of claim 5, wherein execution of the specific computer-executable instructions further causes the one or more hardware computing devices to:

identify, based on results of analyzing at least a portion of the virtual network, a second type of function of a fourth virtual machine in the virtual network;

determine that the fourth virtual machine was not identified by a previous analysis of at least the portion of the virtual network; and cause a third honeypot to be deployed in connection with the virtual network using a second template retrieved from the electronic data store.

11. The system of claim 5, wherein execution of the specific computer-executable instructions further causes the one or more hardware computing devices to:
determine that the template and a second template from the plurality of different templates both match a plurality of properties of the first virtual machine;
prompt the user to select, from a group of templates including the template and the second template, a particular template to be used to deploy the honeypot;
receive a selection of the template from a computing device associated with the user; and
responsive to the selection, cause the honeypot to be deployed.

12. A method, comprising:
receiving, from a computing device associated with a user account, a request to analyze at least a portion of a virtual network associated with the user account;
in response to the request to analyze at least the portion of the virtual network, analyzing at least the portion of the virtual network associated with the user account;
identifying at least one virtual machine instance of a first type in the virtual network based on the analyzing;
selecting, based at least in part on a profile based at least in part on the analyzing, a virtual machine image having a type matching the first type and associated with a countermeasure;
causing a second virtual machine to be launched in connection with the virtual network associated with the user account using the virtual machine image;
identifying at least one virtual machine instance of a second type in the virtual network based on the analyzing, wherein the at least one virtual machine instance of the first type and the at least one virtual machine instance of the second type are connected in a first network configuration;
causing a third virtual machine to be launched in connection with the virtual network associated with the user account using a second virtual machine image having a type matching the second type; and
causing the second virtual machine and the third virtual machine to be connected within the virtual network in a second network configuration selected based at least in part on the first network configuration such that the second virtual machine and the third virtual machine emulate at least a portion of the first network configuration, wherein the second network configuration connects the second virtual machine and the third virtual machine to the virtual network.

13. The method of claim 12, wherein analyzing at least the portion of the virtual network comprises scanning the portion of the virtual network.

14. The method of claim 13, wherein scanning the portion of the virtual network comprises causing a fourth virtual machine within the virtual network to send one or more messages to other virtual machine instances in the virtual network.

15. The method of claim 14, further comprising causing the fourth virtual machine to be launched within the virtual network prior to scanning the virtual network.

16. The method of claim 12, further comprising:
determining, based on the profile, that the virtual network is attached to first storage provided by a service provider; and
causing second storage to be attached to the second virtual machine.

17. The method of claim 16, further comprising causing a plurality of content items to be stored in the second storage, wherein properties of the plurality of content items are based on properties of content items in the first storage.

18. The method of claim 17, further comprising:
selecting, based on the properties of content items in the first storage, template content items from a repository of template content; and
generating the plurality of content items using the template content items and identifying information.

19. The method of claim 12, further comprising causing the honeypot to be associated with a plurality of IP addresses within the virtual network.

20. The system of claim 1, wherein the one or more hardware computing devices are further configured to execute specific computer-executable instructions that upon execution cause the system to:
identify a type of function of the first virtual machine provided in the virtual network based on at least one of the first properties; and
select, based at least in part on the identified function of the virtual machine, the first template for the first honeypot instance configured based at least in part on the identified function.

* * * * *